US011628356B2

(12) United States Patent
Yong

(10) Patent No.: US 11,628,356 B2
(45) Date of Patent: Apr. 18, 2023

(54) MASSIVE MULTI-PLAYER COMPUTE

(71) Applicant: Sony Interactive Entertainment LLC, San Mateo, CA (US)

(72) Inventor: Kelvin Yong, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 17/584,238

(22) Filed: Jan. 25, 2022

(65) Prior Publication Data
US 2022/0203227 A1 Jun. 30, 2022

Related U.S. Application Data

(63) Continuation of application No. 16/900,623, filed on Jun. 12, 2020, now Pat. No. 11,229,838, which is a continuation of application No. 16/724,098, filed on Dec. 20, 2019, now Pat. No. 10,688,391, which is a
(Continued)

(51) Int. Cl.
*A63F 13/352* (2014.01)
*A63F 13/358* (2014.01)
*G06F 9/50* (2006.01)
*A63F 13/847* (2014.01)
*A63F 13/795* (2014.01)

(52) U.S. Cl.
CPC .......... *A63F 13/352* (2014.09); *A63F 13/358* (2014.09); *A63F 13/795* (2014.09); *A63F 13/847* (2014.09); *G06F 9/5077* (2013.01)

(58) Field of Classification Search
CPC .... A63F 13/352; A63F 13/358; A63F 13/795; A63F 13/847; G06F 9/5077

USPC ......................................................... 463/42
See application file for complete search history.

(56) References Cited

U.S. PATENT DOCUMENTS 8,784,214 B2 * 7/2014 Parks ...................... A63F 13/33
463/40
8,898,325 B2 * 11/2014 Lee ......................... G06F 30/20
709/230

(Continued)

FOREIGN PATENT DOCUMENTS

JP 2017037446 A 2/2017

OTHER PUBLICATIONS

NPL_Ebara et al., Dynamic Domain Decomposition Coupling Algorithm in MMORPG, The Institute of Electronics, Information and Communication Engineers Journal, Apr. 1, 2015, vol. J98-A No. 4, total pp. 37.

*Primary Examiner* — Allen Chan
(74) *Attorney, Agent, or Firm* — Penilla IP, APC

(57) ABSTRACT

Methods and systems for managing processing resources of an online game include executing the online game for one or more users. Each user is provided access to virtual locations in a gaming world of the online game. A compute is assigned for processing gaming interactivity of the one or more users in the gaming world. A number of users accessing a region within a virtual location are determined. When the number of users exceeds a predefined limit for the compute assigned to the users in the region, the region is divided into a plurality of sub-regions and additional compute is assigned for the region so that the compute and the additional compute can process gaming interactivity for the users in each of the sub-regions defined in the gaming world.

13 Claims, 10 Drawing Sheets

Related U.S. Application Data continuation of application No. 16/228,401, filed on Dec. 20, 2018, now Pat. No. 10,549,189.

(56) References Cited

U.S. PATENT DOCUMENTS

| | | | |
|---|---|---|---|
| 9,005,027 B2* | 4/2015 | Lee | G06N 3/006 463/40 |
| 10,207,184 B1* | 2/2019 | Leung | H04L 65/1063 |
| 10,484,249 B1* | 11/2019 | Cheng | H04L 41/145 |
| 2012/0252569 A1* | 10/2012 | Harp | A63F 13/47 463/29 |
| 2013/0204917 A1* | 8/2013 | Wang | A01C 5/04 709/201 |
| 2014/0362110 A1 | 12/2014 | Stafford | |

* cited by examiner (Scenario 1)

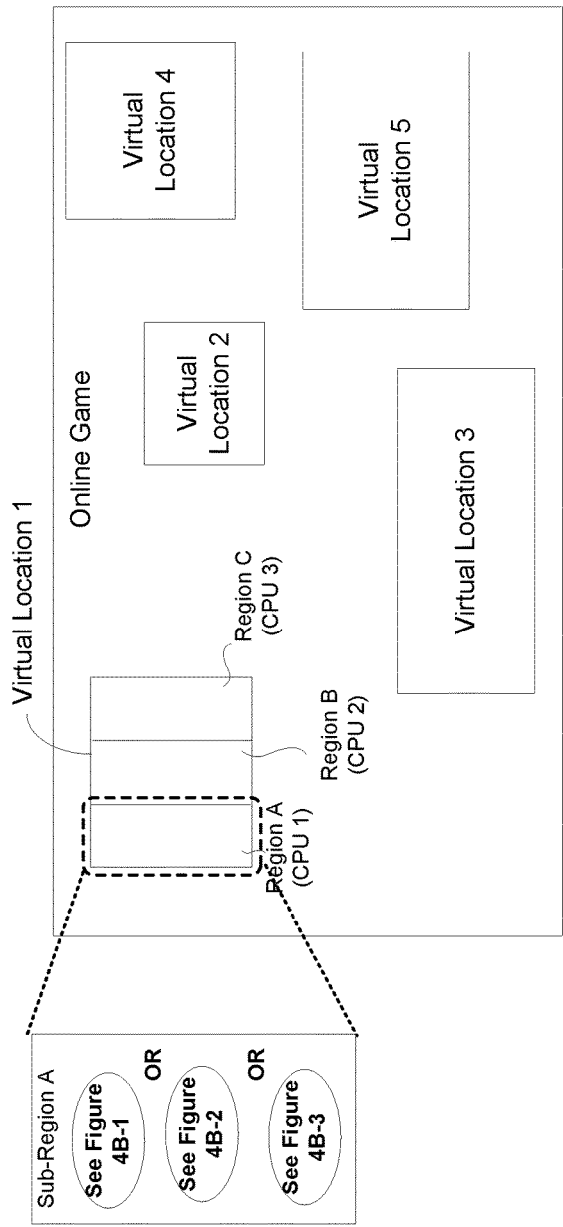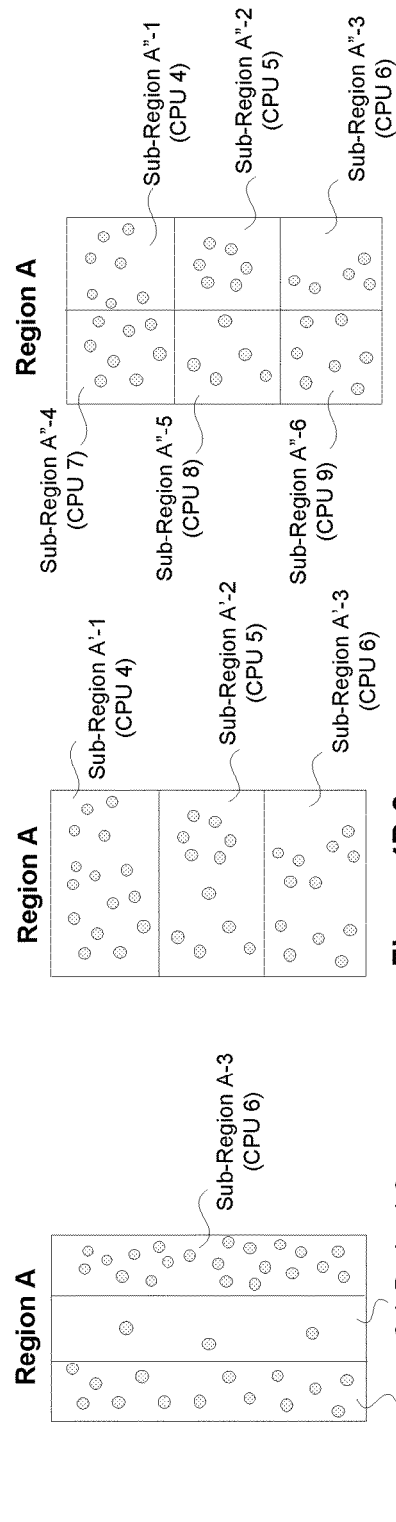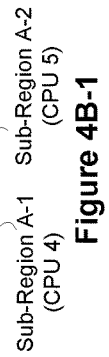

(Scenario 3)

MASSIVE MULTI-PLAYER COMPUTE

CLAIM OF PRIORITY

This application is a continuation of and claims priority to U.S. patent application Ser. No. 16/900,623, filed on Jun. 12, 2020, and entitled, "Massive Multi-Player Compute," which is a continuation of U.S. patent application Ser. No. 16/724,098, filed on Dec. 20, 2019, (since issued as U.S. Pat. No. 10,688,391 on Jun. 23, 2020) and entitled, "Massive Multi-Player Compute," which is a continuation of U.S. patent application Ser. No. 16/228,401, filed on Dec. 20, 2018, (since issued as U.S. Pat. No. 10,549,189 on Feb. 4, 2020) and entitled "Massive Multi-Player Compute," the disclosures of which are incorporated herein by reference in their entirety.

TECHNICAL FIELD

The present disclosure is related to allocating resources for an online game, and more specifically to a deterministic way of allocating computes, when a large number of players enter a particular virtual game area.

BACKGROUND OF THE DISCLOSURE

Online game has grown in popularity within the gaming world. Traditionally, games used either a client-server setup or a peer-to-peer setup for executing a game for game play. In a typical client-server setup, the server needs to provide sufficient compute power to process physics, audio, transmission, etc., of the game data that is generated during game play of the game. With the growing popularity of massive multi-player online game (MMO), the traditional client-server setup is unable to handle the processing load (i.e., game data) resulting from inputs provided by a plurality of users (e.g., 1000s of players) during game play. In the MMO game, each of the plurality of players needs to be provided with their own perception of the gaming world during game play. For example, a first player may be approaching a certain challenge from the right side of a gaming world, a second player may be approaching the same challenge from the left side of the gaming world, while a third player may be approaching the challenge from a front side of the gaming world. Each of these players may provide inputs to overcome the certain challenge. The server needs to determine which player's inputs need to be processed first and to generate the overall game state of the game. The server also needs to be able to generate different game data for each of the players so as to provide their own perception of the gaming world. The server has limited resources to only support a certain number of players (i.e., users) and when the number of players exceeds this certain number, the resources of the server may be stretched too thin, resulting in less-than-optimal quality of game play of the game. In a peer-to-peer setup, the processing burden is more on a network that is used to exchange game data, while the processing is distributed among the peers. Additionally, one of the peers acts as the "server" and takes on additional processing load, which can add to stress on the resources of that peer.

In a typical MMO game, there can be hundreds or thousands of players that may be accessing the online game, at any given time. In order to allow the players to have an optimal game play experience, a plurality of servers may be used to support game play of the hundreds or thousands of players and the players may be organized into logical grouping, with each logical grouping assigned to a server realm. However, as in the above client-server setup, the server realm has a limit on the number of users (i.e., game play characters). When a new user initiates a request to access the game play in a particular server realm, the new user may be put in a queue for the server realm if the number of users in the server realm has reached the server's limit resulting in unnecessary delay for the new user to initiate the game play. Additionally, if the new user requests to join a particular server realm that is in a different time zone, the new user may be assigned to the particular server realm even though the particular server realm may not be the optimal option, based on the user's current geo location. This is especially an issue, when the new user wants to engage in game play of the online game with his friends and want to start at a certain level of game play. The assignment of the new user to the particular server realm would result in the new user experiencing latency, which can cause less than satisfactory experience for the new user.

It is in this context that embodiments of the disclosure arise.

SUMMARY

Embodiments of the present disclosure relate to systems and methods for provisioning resources for an online game. The online game is executed using a distributed game engine to provide video frames of game data that includes a view of the gaming world of the game for rendering on client devices of users that are playing or viewing the online game. The distributed game engine includes a plurality of components to keep track of context (i.e., game state) of the online game, each user's location within the online game, and to proactively provision necessary compute/computing resources to assist in processing users' inputs provided by the users to generate game data for each user of the online game. The components of the distributed game engine are configured to identify a plurality of virtual locations within the online game, identify processing load on one or more computes (i.e., computing device) assigned to users that are present in each virtual location of the online game, and proactively scale the computes assigned to each virtual location up or down so as to handle the processing load in each virtual location.

To begin with, the distributed game engine may first assign a compute to users that are present in each virtual location identified in the online game and monitor the processing load on the assigned compute(s) associated with the online game. The processing load may be affected by the users moving into or out of a region defined within a virtual location of the online game. Based on the monitoring, the distributed game engine may adjust the computes assigned to each virtual location of the online game so that the assigned compute is configured to handle the processing load at the respective virtual location. The adjustment to the computes may include assigning additional compute(s) to handle an increase in the processing load at a particular virtual location, or de-assigning one or more computes assigned to the particular virtual location based on decrease in the processing load. To add additional computes, the distributed game engine monitors a number of users within a region of a particular virtual location, and determines if the number of users exceeds a limit that is predefined for the compute assigned to the particular virtual location. When the number of users in the region exceeds the predefined number for the assigned compute, the distributed game engine may sub-divide the region within the particular virtual location into a plurality of sub-regions and assign additional compute to process user inputs defining gaming interactivity provide by users in the region. In some implementations, a distinct compute may be assigned to process user inputs of users in each sub-region. In some implementation, the compute assigned to the region or the particular virtual location may be assigned to one of the sub-regions defined within the region. In another implementation, the compute assigned to the particular virtual location or region may be used to coordinate the processing of the gaming interactivity handled by the distinct computes assigned to the various sub-regions generated within the region of the particular virtual location.

Alternately, the distributed game engine may optimize the amount of computes assigned to the online game by de-assigning some of the computes assigned to the online game. In order to de-assign some of the computes, the distributed game engine may first assign that was used to process gaming interactivity generated at a first virtual location to also handle the gaming interactivity (i.e., processing load) of both the first and second virtual locations, and de-assign the second compute that was assigned to process the gaming interactivity in the second virtual location. In this case, the compute assigned to the second virtual location is de-assigned after the game data resulting from processing gaming interactivity, is synchronized between the first and the second computes. The distributed game engine continues to monitor the number of users in each region of each of the virtual locations and proactively manage the computes assigned to the online game.

In one implementation, a method for managing processing resources for an online game that presents a gaming world, is disclosed. The method includes executing the online game for one or more users. Each of the one or more users is provided access to one or more virtual locations of the gaming world. A compute is assigned to the one or more users for processing gaming interactivity in the gaming world. When a number of users accessing a region within a virtual location identified in the online game exceeds a predefined limit for said compute assigned to the users, the region is divided into a plurality of sub-regions. Additional compute is assigned for the region, such that the compute and the additional compute are configured to process gaming interactivity in the gaming world for the users in each of the sub-regions.

In some implementations, a number of sub-regions created in the region is based on the number of users present in the region. Each sub-region created in the region includes at least one user of the region.

In some implementations, the gaming interactivity received in the region corresponds to user inputs provided by one or more users in the region. The one or more users are players or spectators.

In some implementations, each sub-region created within the region is assigned a distinct compute to process user inputs representing gaming interactivity for said sub-region.

In some implementations, the processing of gaming interactivity includes determining an optimal processing sequence of the gaming interactivity in each sub-region based on relative context of the gaming interactivity provided by each user. The gaming interactivity is processed in each sub-region in accordance to the optimal processing sequence, the optimal processing sequence determines a sequence of game video data provided to each user at their client device for rendering.

In some implementations, the optimal processing sequence for the game video data for each user is determined based on priority, or importance, or criticality, or need, or any combinations of two or more thereof.

In some implementations, the optimal processing sequence is based on timing of the gaming interactivities occurring during the game play.

In some implementations, movement of the users within each sub-region of the region is tracked to determine number of users accessing the region. The movement of the users is used to adjust the compute assigned to the region.

In some implementations, adjusting the compute includes de-assigning the additional compute assigned to the region, when the number of users within the region falls below the predefined limit for the compute, based on movement of one or more users.

In some implementations, the compute assigned to the region is adjusted by detecting one or more users moving out of the region, in response, de-assigning the compute or the additional compute assigned to the region. The de-assigning is performed after successful synchronization of game related data of the gaming world between the compute and the additional compute. The game related data is generated from the processing of gaming interactivity of the users in the region.

In some implementations, the adjustment is done based on resource capabilities of the compute and the additional compute and the resource requirements of the region.

In some implementations, each sub-region of the region is defined by a boundary and is assigned a distinct compute to process gaming interactivity for the users in the corresponding sub-region. The movement of the users in the region is tracked and when it is determined that a user from a sub-region of the region has moved to a boundary between two consecutive sub-regions, communication between computes assigned to each of the two consecutive sub-regions is managed so as to enable processing of gaming interactivity of the user. The processing of gaming interactivity is synchronized between the computes.

In some implementations, the movement of the users in the region within the virtual location is tracked and the sub-regions within the region are adjusted based on number of users accessing the region. The adjusting includes merging one or more sub-regions within the region or creating additional sub-regions within the region. The adjusting of the sub-regions causes adjustment to the compute assigned for the region.

In an alternate implementation, a method for managing resources of an online game, is disclosed. The method includes executing the online game, in response to user inputs received from a plurality of users. The execution of the online game provides access to virtual locations within a gaming world of the online game. Compute is assigned to one or more users present in each virtual location. The compute is configured to process the user inputs of the one or more users present within the corresponding virtual location to generate game video data each of the users. Movement of each user is tracked within the gaming world to determine when a number of users access a region within one of the virtual locations. The region is sub-divided into a plurality of sub-regions, when the number of users exceeds a predefined limit for the compute assigned to the users in the region. Additional compute is assigned for the region, such that the compute and the additional compute process the user inputs provided by each of the users in the region to generated corresponding video game data for each of the users.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings.

FIGS. 4A-4C illustrate different ways sub-regions can be generated for a virtual location within a gaming world of an online game, in accordance with one implementation of the present disclosure.

DETAILED DESCRIPTION

Figure 1:
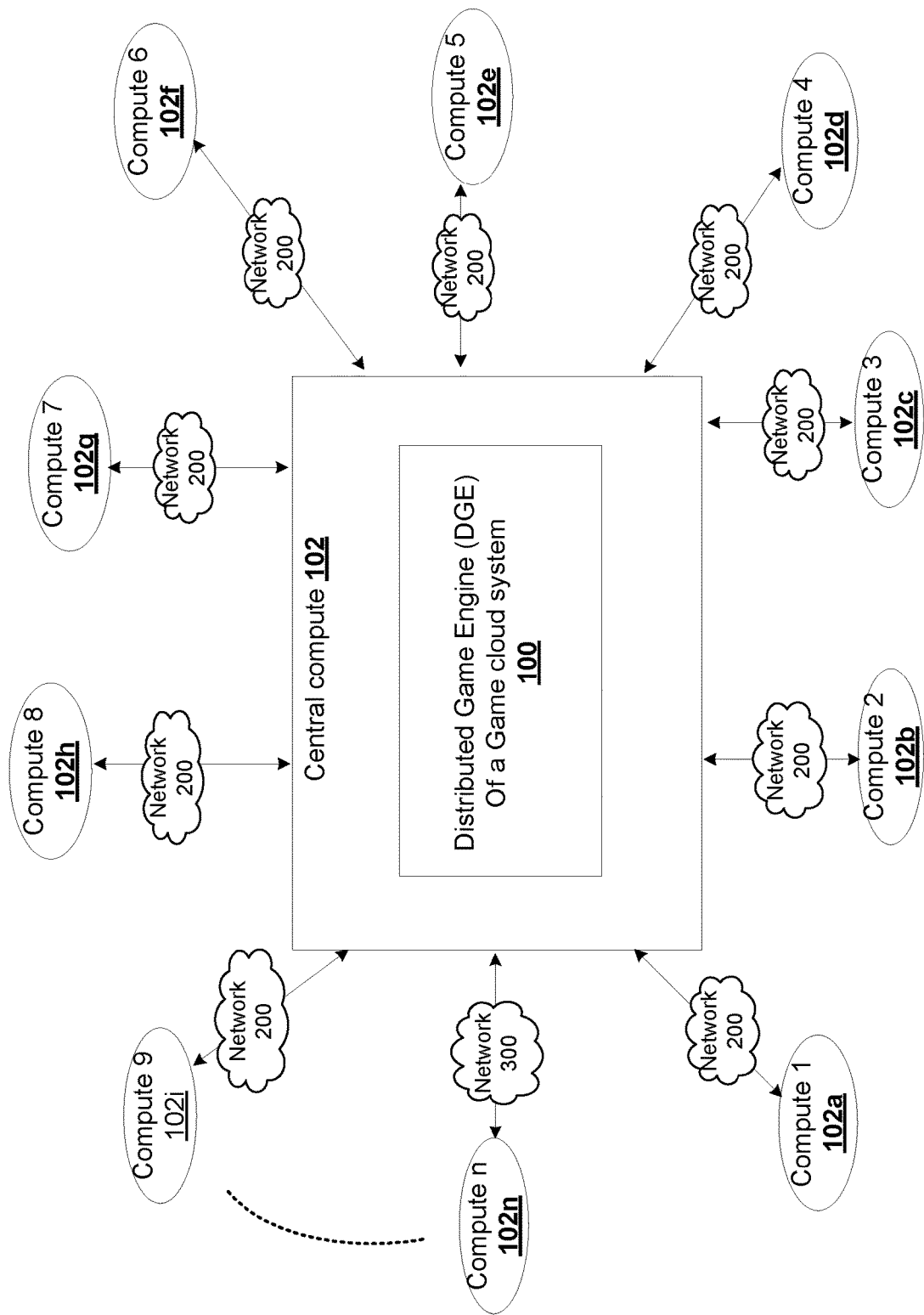
FIG. 1 illustrates a simplified block view of a distributed game engine executing on a game cloud system that is used for provisioning resources for an online game, in accordance with one implementation of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods that provide ways to understand the resource requirements for the online game, resource capabilities of each compute assigned to the online game, and dynamically adjust the computes allocated to the online game during game play so as to provide optimal resource allocation for the online game. The online game may be a massive multi-player online (MMO) game that is accessed by a plurality of users. The plurality of users may be players that are accessing the online game for game play, or may be spectators that are accessing the online game to view the game play or to follow specific one or more players playing the online game, or combinations of both the players and spectators. The MMO game provides game data based on user inputs received from the plurality of users via gaming interactivity. The game data generated for a player and for spectators that follow the player includes game state of the online game associated with the player. The game data generated for the plurality of players includes gaming world view of the online game.

A plurality of virtual locations is identified in the gaming world. Each virtual location is a region in the gaming world having defined boundaries within which one or more users (players and/or spectators) of the online game are present Gaming interactivity in the form of user inputs in each virtual location are monitored to determine amount of gaming interactivity that is being generated at each virtual location. Compute is assigned to users of the online game to handle the processing of the gaming interactivity generated in the gaming world. The compute assigned to the online game is identified based on the processing resources available to service the processing load defined by the gaming interactivity. As each user progresses through the online game, the user's location in the gaming world may change from a first virtual location to a second virtual location. The distributed game engine monitors movement of each user in the gaming world to determine when a number of users is accessing a region within a particular virtual location. The number of users in the region may result in an increase in the gaming interactivity in the region within the particular virtual location. Each compute has a predefined limit on the number of users whose gaming interactivity it can handle. If the number of users in the region exceeds the predefined limit for the assigned compute, the region in the particular virtual location is dynamically sub-divided into a plurality of sub-regions with each sub-region having at least one user from the region. Additional compute is assigned for the region to handle the processing load resulting from the gaming interactivity in the gaming world for the users and to generate game video data for each of the users in each of the sub-regions. In some implementations, each sub-region is assigned a distinct compute to handle the gaming interactivity of users in the corresponding sub-region. The computes assigned to each of the sub-regions are identified based on the resources required to handle the processing load generated from the gaming interactivity at the sub-region.

After assigning the compute, movement of the users are monitored to determine when one or more users move out of a region to a different region. Responsive to the monitoring, the computes assigned to the online game may be evaluated to determine if some of the computes can be de-assigned or re-assigned to handle gaming interactivity of users of a different virtual environment within the online game. The de-assigning or re-assigning of compute is performed after successfully migrating the game data generated from the processing of the gaming interactivity of the users, from the compute that is being de-assigned to a compute that is assigned to handle the gaming interactivity of the online game.

With the above general understanding of the various embodiments, example details of the embodiments will now be described with reference to the various drawings.

FIG. 1 illustrates a simplified block diagram of a distributed game engine 100 used in the game cloud system for executing an MMO game (i.e., online game) that is accessed by a plurality of users from different geo locations, in one implementation. The distributed game engine 100 includes functional components that are used to process specific features of the online game. Instances of the distributed game engine 100 along with game logic of the online game may be executed on one or more servers (i.e., computes 102a through 102n) of the game cloud system, wherein one or more of the instances may be used to process a specific feature of the online game. The functional components include engines/modules for processing the specific features of the online game. Some of the features of the online game that may be processed by different functional components of the distributed game engine may include physics, audio, shading, texturing, assembling/encoding, scripting, artificial intelligence (AI), memory management, scripting, animation, scene graph, to name a few.

The game cloud system includes a network of back-end servers (e.g., computes 1-n) executing instances of one or more online game applications, in accordance with one implementation of the present disclosure. One or more client devices (not shown) are used to access the online game executing on the game servers of the game cloud system through a network 200, such as the Internet. The client devices could be any computing device, such as mobile phone, tablet computer, personal computer, etc., that includes at least a memory, processor and a network interface to interact with the back-end servers via the network 200, or could be a thin client that provides the interfaces to interact with the back-end server, which provides the computation functions. A back-end server is a game server that is configured to execute one or more instances of one or more games. The game server may be any type of server computing device available in the game cloud system. In one example implementation, the game server may be a virtual machine supporting a game processor that executes an instance of an online game for a user, using resources of a host. In another example implementation, the game server may be a stand-alone physical server or a physical server that is part of a single data center or part of a plurality of data centers. In one implementation, a central server (i.e., central compute) 102 executing an instance of the distributed game engine 100 and game logic may coordinate the inputs and outputs to the different servers (i.e., computes) 102a-102n through the network 200, assemble the outputs from the different servers and encode the outputs of the online game for onward transmission to the one or more client devices over the network 200. The network 200 may be any type of network including the Internet, wide area network, local area network, private network, game network, etc.

The online game may be executed remotely by the plurality of servers (i.e., computes 102a-102n) of the game cloud system and the game data streamed to the client devices of the users (players or spectators) over the network 200. The player is a user that is engaged in game play of the game by providing gaming interactivity (user inputs) to affect a game state of the online game. The spectator is a user that follows general game play of the online game that includes gaming interactivity (user inputs) from a plurality of players or follows a specific player's game play. The game play of the online game is controlled by the players using control options provided in the client devices or using controllers that are communicatively connected to the client devices. In other implementations, the online game may be executed locally at the client devices and metadata from the executing online game is transmitted over the network 200 to the back-end servers of the game cloud system for affecting the game state.

Figure 2:
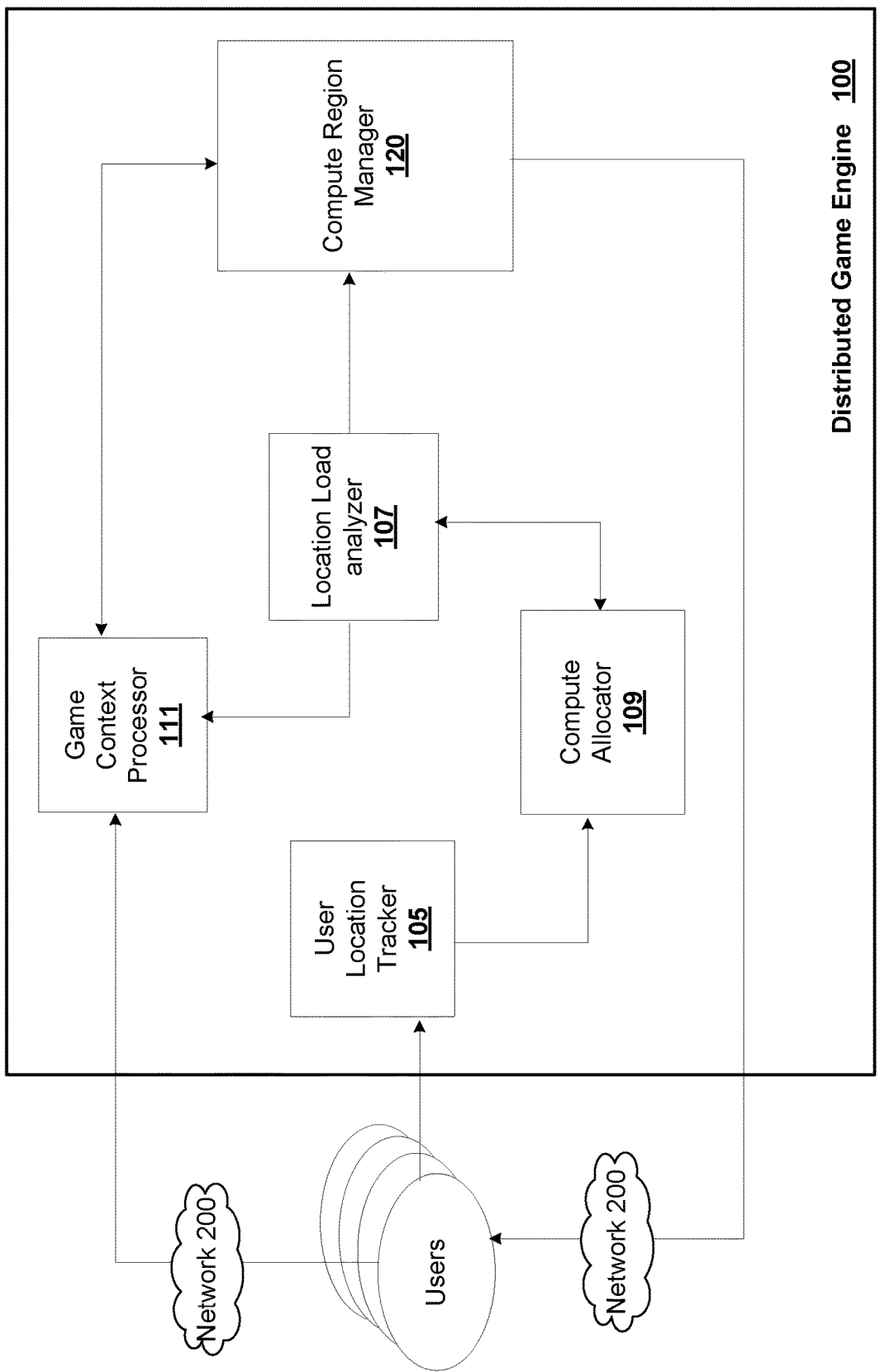
FIG. 2 illustrates a simplified block diagram of a distributed game engine identifying some of the components used for provisioning resources for an online game, in accordance with one implementation of the present disclosure.

FIG. 2 illustrates a block diagram of a distributed game engine 100 used in provisioning computes and computing resources, to handle gaming interactivity generated during game play of an online game, in one implementation. The online game may be a MMO game that is played or accessed by a plurality of users. The plurality of users may be accessing the online game from one geo location or from various geo locations. The distributed game engine includes algorithm to constantly track the movement of the users within a gaming world of the online game and assign different computes to the online game to handle the gaming interactivity generated in the gaming world of the online game. The algorithm provides the users access to different virtual locations of the gaming world and manages processing of the gaming interactivity generated in each of the virtual locations. To process the gaming interactivity of the users of the online game in a fast and efficient manner, instances of the distributed game engine and game logic of the online game are executed on different computes (i.e., servers) with the computes used to process the gaming interactivity generated in each virtual location identified in the gaming world. Further, one of the compute (e.g., a central server) executing an instance of the game engine may be used to manage inputs and outputs for each of the computes assigned to the online game, assemble the outputs from all the computes, and to generate game video data that includes game states of the online game, for each of the users playing or following the online game. The computes assigned to the online game may be part of a single data center or multiple data centers. The distributed game engine uses parallel processing to process the constantly changing game video data resulting from gaming interactivity (user inputs) provided by the different users, and provides frames of game video data to the respective client devices associated with the different users.

The distributed game engine 100 includes a plurality of components that are used to manage computes and computing resources assigned to process the gaming interactivity generated in the different virtual locations identified in a gaming world of the online game. Some of the components of the distributed game engine 100 include a user location tracker 105, a location load analyzer 107, a compute allocator 109, a game context processor 111, and a dynamic compute region manager 120. The user location tracker 105 is used to monitor movement of each user in the gaming world and to identify a virtual location where each user is present within the gaming world. As part of tracking, the user location tracker 105 may determine when a number of users of the online game access a region within a particular virtual location. The number of users within the region may be a subset of the users that are accessing the online game. As more and more users access a region, the region may experience an increase in gaming interactivity by the users in the region. The increase in gaming interactivity results in an increase in the game video data (also referred to herein as game data) generated in the region as each user in the region has to be provided with their own perspective of the online game. The user can be a player or a spectator. The game data for a player includes a game state of the online game for that player. The game data generated for a spectator includes a game state of the online game of the player that the spectator is following in the region of the online game. In some implementations, the compute may define a separate predefined limit for a number of players and number of spectators that it can handle. The predefined limit may be specific for a type of player (e.g., expert level player, medium level player or novice level player) that is accessing a region or virtual location within the gaming world. In such implementations, the user location tracker 105 may determine the type and number of users of each type that are accessing the region in the particular virtual location of the gaming world, and generate a signal to the location load analyzer 107 to evaluate the compute assigned to the online game and to determine if the compute assigned to the online game is configured to handle the number of users in the region.

In some implementations, the online game may be assigned a plurality of computes such that a distinct compute is assigned to users of each virtual location identified in the gaming world of the online game to process gaming interactivity generated by the users in the corresponding virtual location. Each compute assigned to the online game may have a predefined limit on the number of users that the compute can handle. As mentioned above, each compute may have a predefined limit for each type of user accessing the online game. The location load analyzer 107, in response to the signal from the user location tracker 105, evaluates the type of users and number of users of each type in the region. When the number of users of each type exceeds the corresponding predefined limit, the location load analyzer 107 interacts with the compute allocator 109 to adjust the compute for the region.

The compute allocator 109, based on the information exchanged by the location load analyzer 107, determines the capability of compute(s) assigned to each virtual location in the gaming world, and identifies additional compute for assigning to the region in the particular virtual location. The compute allocator 109 dynamically provisions the identified additional compute, such that the compute and the additional compute are able to process the gaming interactivity in the region of the particular virtual location. The compute allocator 109 may provision the additional compute at the micro-level, such as additional CPU cores to the existing compute(s), etc., or at the macro-level, such as additional one or more servers (i.e., computes) to the particular virtual location. The allocation of the additional compute includes migration of the gaming interactivity of certain ones of the users in the region of the particular virtual location to the additional compute so as to allow the additional computes to handle the processing of the gaming interactivity generated in the region. The compute and the additional compute assigned for the users in the particular virtual location work together to process the gaming interactivity of the users in the region and in the particular virtual location and generate game data to each of the users in the particular virtual location.

After allocating additional computes to the online game to handle the processing load resulting from gaming interactivity of the users in the online game, the distributed game engine uses a dynamic compute region manager 120 to continuously monitor the movement of the users within the gaming world and to manage the computes assigned to the online game. The monitoring may result in adjusting the compute assigned to the online game. For example, during game play, the amount of gaming interactivity in a virtual location may be affected by the movement of users into or out of the virtual location, or by increased interactions between any two users within the virtual location or within two different virtual locations, etc. The compute region manager 120 tracks the movement of the users and the gaming interactivity within different virtual locations identified in the gaming world, evaluates the number of users, gaming interactivities of the users in the different virtual locations and dynamically adjusts the compute(s) assigned to the online game by scaling up or down the computes assigned to process gaming interactivities of users in different each virtual location of the online game.

When a number of users access a specific region within a virtual location at a given time, the number of users is verified against a predefined limit defined for the compute assigned to process the users gaming interactivity in the virtual location. When it is determined that the number of users in the specific region exceeds the capacity of the one or more computes assigned to the virtual location, the compute region manager 120, in some implementation, divides the specific region into a plurality of sub-regions. Each sub-region is defined by sub-boundary. The number of sub-regions that are created are based on type and number of users of each type that are present in the specific region. In some implementations, sub-division criteria identifying the type of users (e.g., players or spectators) and number of users of each type may be used in determining the number of sub-regions to create within the specific region. The sub-regions created within the region may be of equal size or of differing size. Each of the sub-regions includes at least one user from the region.

Figure 4A:
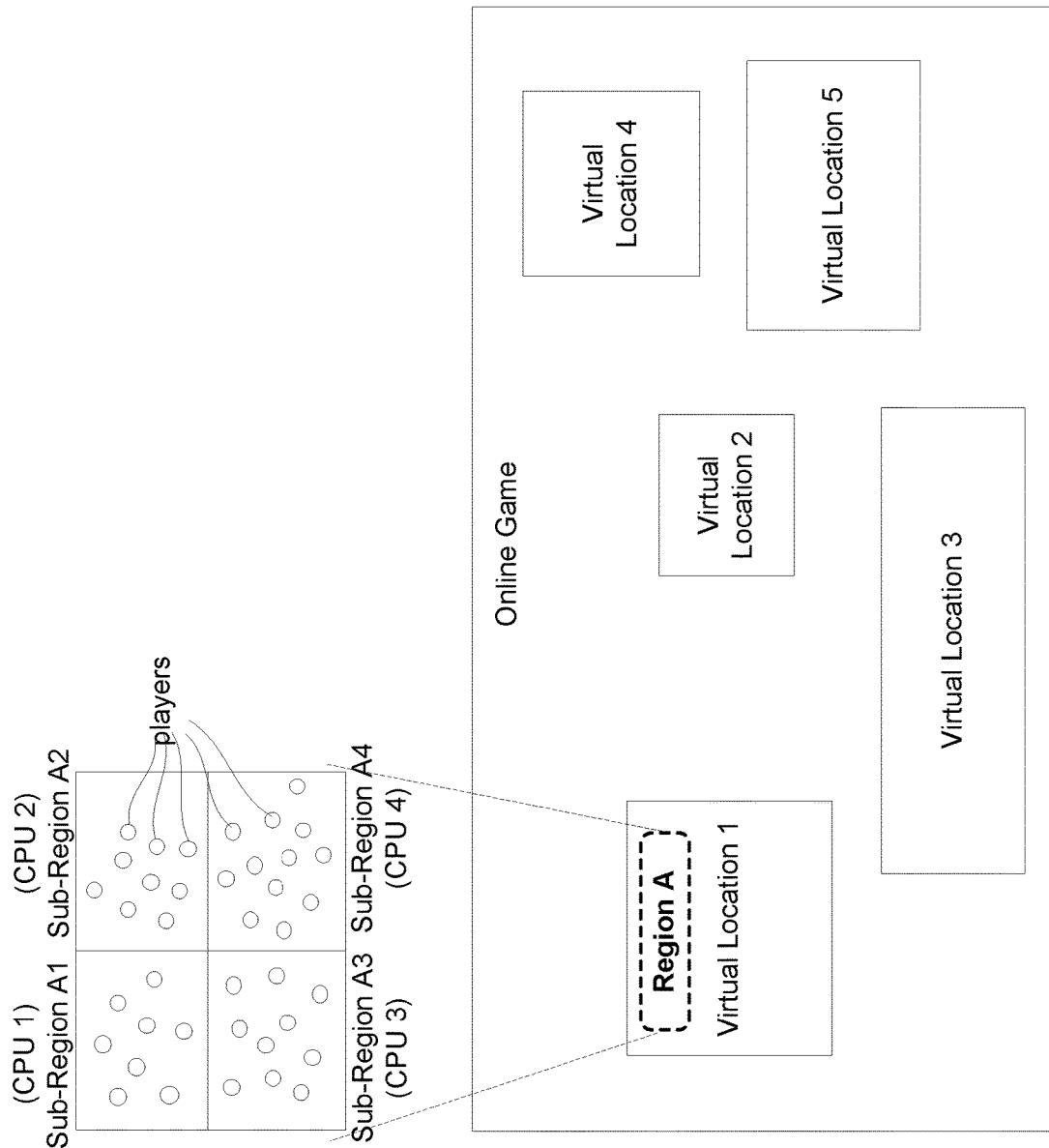
Figure 4C:
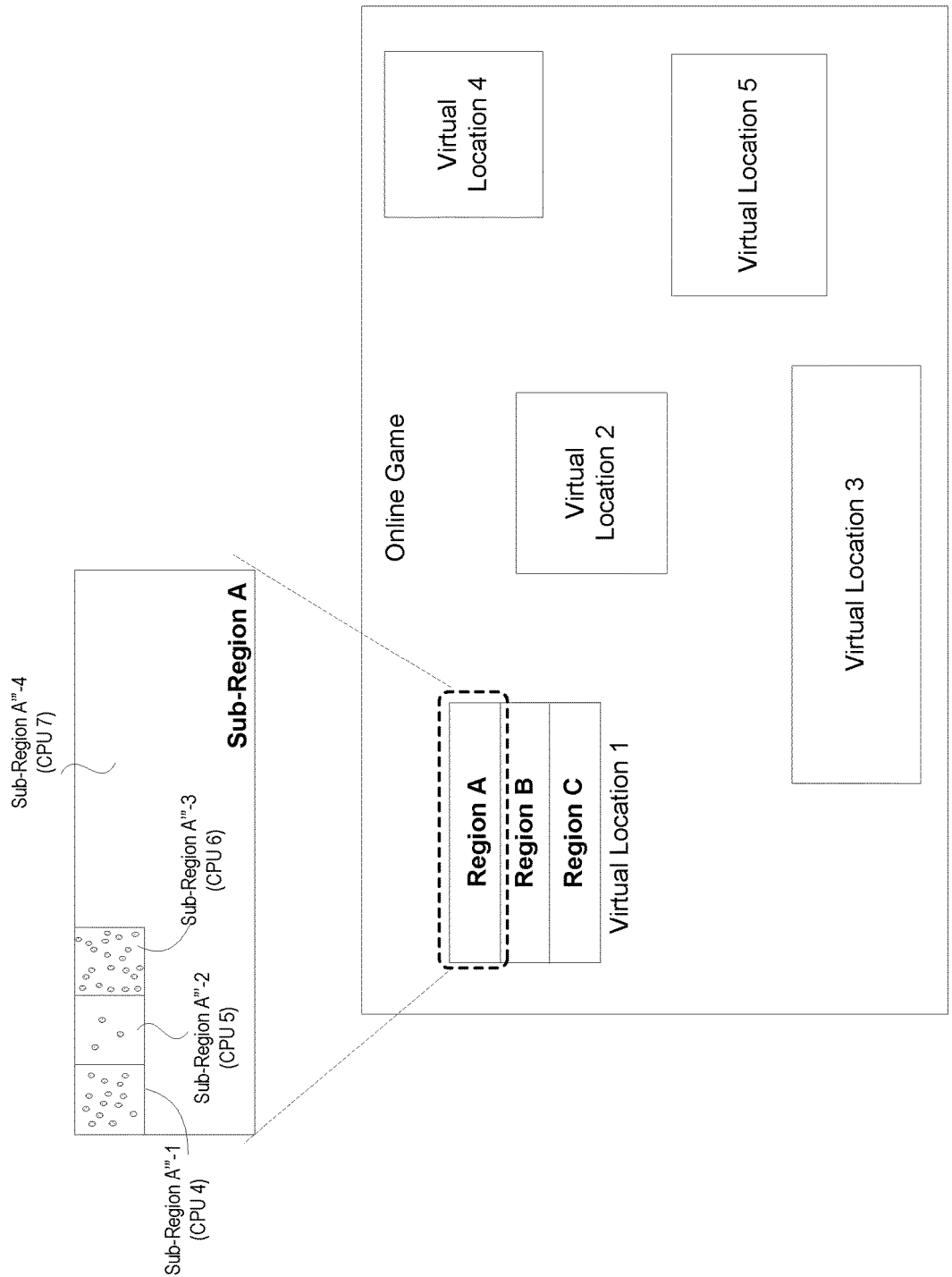

FIGS. 4A-4C illustrate various scenarios of how sub-regions may be defined within a region of a virtual location identified in the gaming world. As mentioned above, the virtual location may include regions, each of which can be sub-divided into a plurality of sub-regions and the number of sub-regions is based on the density of the users in a specific region of the virtual location. When users select the online game for game play, the users are provided access to virtual locations of the gaming world defined in the online game. As the users are moving around in the gaming world, a number of users may enter a specific region within a particular virtual location at a given time. The specific region is defined as a portion of the particular virtual location. When the number of users in the specific region exceeds a predefined limit defined for a compute assigned to the online game, the region may be divided into a plurality of sub-regions with each region assigned a distinct compute so as to distribute the processing load in the specific region of the particular virtual location. The processing load on the compute assigned to a particular virtual location corresponds to amount of gaming interactivity provided by the users in the particular virtual location. The number of sub-regions is based on the density of the users in the region. In some implementations, the sub-regions may cover the entire area of the region based on the distribution of the users within the region. In alternate implementations, the sub-regions may cover only a portion of the region based on the distribution of the users in the region.

FIG. 4A illustrates one representation, wherein a region, region A, representing a portion of a particular virtual location, location 1, is accessed by a number of users at a given time. The number of users in region A is determined to exceed the predefined limit of the compute assigned to process the gaming interactivity of the users in location 1. As a result, the region A is sub-divided into four different sub-regions—sub-regions A1, A2, A3 and A4. In the example illustration of FIG. 4A, the number of sub-regions is based on number of users in virtual location 1. The sub-regions are of equal size and each of the sub-regions includes one or more users from region A. The number of users in each of the sub-regions may or may not be the same. The users in each sub-region include players and/or spectators of the online game. It should be noted that even when the users are spectators who are not providing gaming interactivities (i.e., user inputs) to affect game state of the online game, each of the spectators following a player may have to be presented with the corresponding player's perspective of the online game. Alternately, each of the spectators may be following the overall flow of the online game in general, and may be provided with a view of the gaming world.

Each created sub-region is assigned distinct compute(s) to process the gaming interactivity generated within to provide game data for each user in the corresponding sub-region. For example, sub-region A1 is assigned CPU 1, sub-region A2 is assigned CPU 2, sub-region A3 is assigned CPU 3, and sub-region A4 is assigned CPU 4, wherein each of the computes (CPU 1, CPU 2, CPU 3 and CPU 4) assigned to the sub-regions A1, A2, A3 and A4, respectively, are identified based on the resources available to handle the processing load resulting from the gaming interactivity generated in the respective sub-region. In the example illustrated in FIG. 4A, each sub-region is assigned one compute. In other examples, each sub-region may be assigned a plurality of computes to handle the processing load generated therein.

FIG. 4B illustrates an implementation, wherein a virtual location 1 includes a plurality of regions, regions A-C, with each region assigned a distinct compute (CPUs 1-3 respectively) to handle the gaming interactivity generated within each region. As a number of users from other regions within virtual location 1 or from other virtual locations of the gaming world access region A of virtual location 1 at a given time, the region A is divided into a plurality of sub-regions, based on amount of users accessing region A. Each sub-region includes one or more users of region A and is assigned a distinct compute to handle the processing load within the respective sub-region. The number of sub-regions generated within the virtual location 1 is merely an example and that fewer or greater number of sub-regions may be generated within the virtual location 1. FIGS. 4B-1, 4B-2 and 4B-3 show different ways the region A can be divided. For example, as shown in FIGS. 4B-1, region A is divided into 3 additional sub-regions A-1, A-2 and A-3, by dividing the region A along a vertical axis. As shown in FIG. 4B-2, region A is divided into 3 additional sub-regions A'-1, A'-2 and A'-3, by dividing the region A along a horizontal axis. FIG. 4B-3 shows an example wherein region A is subdivided into 6 sub-regions (A"-1 through A"-6). The number of sub-regions created from the division of region A may vary based on the amount of users within the region A.

In the example illustrated in FIGS. 4B-1, 4B-2, and 4B-3, the sub-regions created by dividing region A are equal in size and each of the sub-regions include one or more users of region A. FIGS. 4B-1 through 4B-3 show examples of when a region within a virtual location is divided into sub-regions. The same examples can be extended to dividing a virtual location or a sub-region that is defined within a region of the virtual location. The number of sub-regions and direction of dividing a region is provided as mere examples and that each region may be sub-divided vertically, horizontally, diagonally, or in any other manner, into fewer or greater number of sub-regions and the number of sub-regions is based on density of users and the predefined limit of the compute assigned to the region. Each of the newly created sub-regions is assigned a distinct compute that is separate from the compute assigned to region A. For example, in FIG. 4B-1, sub-regions A-1 through A-3 created within region A are assigned CPUs 4-6, respectively, with CPUs 1-3 being assigned to regions A-C created in virtual location 1 (see FIG. 4B). Similarly, in FIG. 4B-2, sub-regions A'-1 through A'-3 are assigned CPUs 4-6, respectively, and in FIG. 4B-3, sub regions A"-1 through A"-6 are assigned CPUs 4-9, respectively.

In the example scenario illustrated in FIGS. 4B-1, 4B-2 and 4B-3, the compute assigned to region A may coordinate the gaming interactivity processing of all the sub-regions created within region A (sub-regions A-1 through A-3 of FIG. 4B-1, sub-regions A'-1 through A'-3 of FIG. 4B-2, or sub-regions A"-1 through A"-6 of FIG. 4B-3). In alternate implementation, each sub-region within region A, is assigned a distinct compute to process the gaming interactivity generated in the corresponding sub-region by the one or more users, and a compute assigned to one of the sub-regions within region A may coordinate the processing of the gaming interactivity within the sub-regions of region A. The coordination includes managing the inputs and outputs of the different computes within region A, and providing the outputs of the coordinating compute to the compute assigned to region A. As mentioned earlier, the number of regions created within a virtual location and within a sub-region of a virtual location, and the number of computes assigned to each created sub-region is provided as examples and should not be considered restrictive.

In alternate implementations, the sub-regions may be created within a particular portion of a region of a virtual location or additional sub-regions may be created within a particular portion of a sub-region, based on the number of users accessing a particular portion of the region or sub-region during game play. FIG. 4C illustrates one such implementation, wherein a portion of region A identified within virtual location 1 is further divided into three additional sub-regions, A'''-1 through A'''-3, respectively, based on the density of the users within the portion of region A. In this implementation, the remaining portion of region A is considered to be a fourth sub-region A'''-4. The 3 sub-regions, A'''-1 through A'''-3, are of equal size and the fourth sub-region, A'''-4, differs in size from the 3 sub-regions created within the portion of region A. In the example illustrated in FIG. 4C, each of the sub-regions A'''-1 through A'''-3 include one or more users of region A while sub-region A'''-4 may or may not include any user from region A. This may be the case where the users of region A are all accessing the portion of region A where the sub-regions are created while no users are in the remaining portion of region A. As the game progresses, one or more users may move out of one or more of the sub-regions A'''-1 through A'''-3 or from other regions of the particular virtual location or from other virtual locations into sub-region A'''-4. As a result, upon creating the sub-regions, each of the sub-regions A'''-1 through A'''-4, in one implementation, are assigned a distinct compute (CPUs 4-7, respectively). In another implementation, each of the sub-regions A'''-1 through A'''-3 are assigned distinct computes (CPUs 4-6) while sub-region A'''-4 is assigned the compute (CPU 3) of region A. Although the example illustrated in FIG. 4C shows one compute being assigned to each of the sub-regions A'''-1 through A'''-4, there could be multiple computes assigned to each of the sub-regions depending on the processing load detected at each sub-region.

Upon assigning one or more computes to each of the sub-regions created within the sub-region A of region A of virtual location 1, the compute region manager 120 migrates the relevant gaming interactivity of each of the users within region A to the respective one of the computes assigned to the newly created sub-regions. The process of managing virtual locations by generating regions, sub-regions and assigning the computes to the different virtual locations, regions and/or sub-regions continue so long as the users continue to access one or more regions or virtual locations and engage in gaming interactivity for the online game, so that sufficient resources are provisioned to the online game for handling the gaming interactivity.

The game context processor 111 receives as inputs processing load information (i.e., amount of gaming interactivity) of the computes assigned to different virtual locations, from the location load analyzer 107, and users' movement in the gaming world including information related to the users accessing a specific region or sub-region created within one or more of the virtual locations from the compute region manager 120, and uses the information to optimize processing of the gaming interactivity of each user to generate game data for the user. The optimizing of the game data may include determining processing sequence of gaming interactivity provided by different users and for different portions of gaming interactivity of each user based on criticality of the data to each user and processing the user inputs representing the gaming interactivity of each user accordingly. The processing sequence allows some portions of the user inputs for each user to be processed first and the remaining portions processed later. As only some portions of the user inputs for each user need to be processed immediately, optimizing the gaming interactivity processing helps in reducing the stress on the computes. It should be noted that gaming interactivity and user inputs are used interchangeably in this application to refer to inputs provided by users during game play of the online game. The inputs provided by a player may be to control a game state of the game for the player while inputs provided by a spectator may be to control which player's game play the spectator wishes to follow.

For example, considering a virtual location in which 3 regions were identified in a virtual location, a first set of users in the first region may be facing or approaching from the right side of the gaming world and seeing/interacting with a second set of users or game objects in the second region that is disposed to the right side and immediately adjacent to the first region. Similarly, the second set of users in the second region may be facing or approaching from the left side of the gaming world and seeing/interacting with the first set of users or game objects in the first region that is disposed to the left side of the second region. In this scenario, the processing sequence for processing the gaming interactivity of the first set of users in the first region is defined such that the portion of the interactivities directed toward the right side of the first set of users (i.e., the game data related to the direction that the users in the first sub-region are facing) is to be processed first and the interactivities directed toward the left side of the first set of users (i.e., the game data related to the direction that is opposite to the direction the users in the first sub-region are facing) are to be processed second or later. This is because the first set of users in the first sub-region is more interested in what is happening on their right side (i.e., in the direction they are facing) than on their left side (i.e., in the direction that is behind them—an opposite direction than the direction that they are facing). The sequence of the interactivity processing for each user may be based on the visual field of view of the corresponding user.

Similarly, the processing sequence for processing the interactivities for the second set of users in the second region is defined such that the interactivities that are directed toward the left side of the second set of users (i.e., game data related to the direction that the users are facing) is to be processed first and the interactivities that are directed to the right side of the second set of users (i.e., game data related to the direction that is opposite to the direction the users are facing) are to be processed later. Alternately, the processing sequence may be based on the timing associated with the interactivities. For example, a first user in region A fires at a second user in region B and the second user is injured as a result. In response, a third user in region B fires at the first or a fourth user in region A and the first or the fourth user is injured as a result. The game context processor 111 determines which interactivity needs to be processed first by using the timing of each user's activities and processing the interactivities of the different users accordingly to arrive at the game state of the online game, so that each of the users (first, second, third and fourth users) can be presented with the game data that is appropriate for the user. The compute region manager manages the inputs (interactivities) from the users located in the different virtual locations and different regions, sub-regions within the one or more virtual locations and sharing the game states between the different virtual locations, regions and sub-regions within the one or more virtual locations. Information from the compute region manager 120 is used to assign the users to different sub-regions within a virtual location and/or to different virtual locations. The game data with the game state for each user generated by the compute region manager is forwarded to the respective client devices of the users for rendering.

Figure 3A:
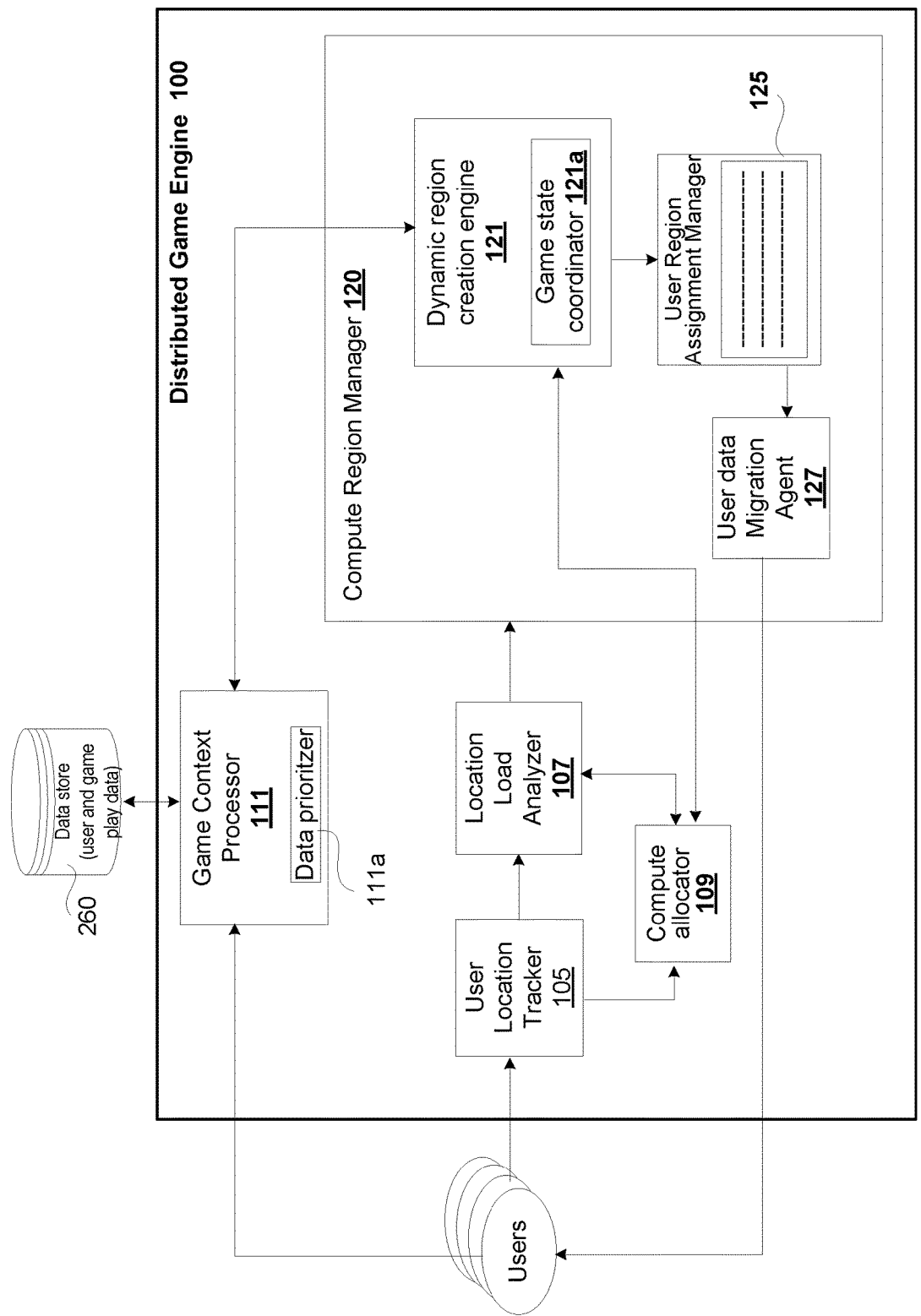
FIG. 3A illustrates simplified block diagram identifying details of some of the components of a compute region manager module of the distributed game engine used in provisioning resources for an online game, in accordance with one implementation of the present disclosure.

FIG. 3A illustrates some of the components used in provisioning resources for an online game, in one implementation. The distributed game engine 100 includes a plurality of components used to process user inputs of a plurality of users to generate game data for each user, identify virtual location of users within a gaming world, detect when users access a region within a particular virtual location at a given time, and responsively provision compute resources to the region so that the gaming interactivity of the users in the region can be processed in a timely manner. When a plurality of users access an online game, such as a MMO game executing on a game cloud system, for game play, the distributed game engine 100 uses a user location tracker 105 to follow the users as they progress through the online game. The users' inputs provided through gaming interactivity are used to generate game data for the respective user. The virtual location in the online game may be defined as a region within a gaming world that includes game objects and challenges of a particular level of the online game. For example, in an intergalactic space game, a virtual location may be defined as an area within a galaxy, such as an area covered by an astronomical object, such as a planet, a star, an asteroid, a space ship, etc., or space between any two astronomical objects that are accessible to users. Similarly, in an inter-nation war game that covers the world, a virtual location may be defined as a country or a continent and a region may be defined as a state or city or town or mountain or river or dam, etc., within a country.

When the users select the online game for game play, the users are provided access to one or more virtual locations within a gaming world of the online game. The user location tracker 105 is used to identify each user's current virtual location in game play. The information provided by the user location tracker 105 may be used to determine when a number of users access a region within a particular virtual location. The plurality of users may have assembled in the region of the particular virtual location at a given time while trying to overcome a challenge in the game play. The number of users in a region may cause an increase in the user inputs (i.e., gaming interactivities) in the region and, as a result, increase in game data generated in the region.

Users in each virtual location within a gaming world are assigned at least one compute to process their gaming interactivities and to generate game data for each user. In some implementations, each compute may have a predefined limit on the number of users that it can handle. A location load analyzer 107 is used to determine if the number of users accessing the region of the virtual location can be handled by the compute assigned to the virtual location or exceeds the predefined limit defined for the compute. When the number of users exceeds the capacity of the compute, the location load analyzer 107 signals a compute allocator 109 to provision additional compute to assist the existing compute to process the gaming interactivity in the virtual location. The compute allocator 109 determines if an increase in the gaming interactivity can be handled by just increasing the computing resources of the existing compute or if new computes need to be assigned to the virtual location. Based on the determination, the compute allocator either provisions additional resources to the existing compute or signals a dynamic region creation engine 121 to provide additional computes to the virtual location.

The dynamic region creation engine 121 analyzes the type of game (e.g., graphic intense or compute intense) that is being played, the type of users (e.g., high level players, medium level players, novice level players or spectators) who have accessed a region within a particular virtual location of the gaming world and determines if the existing compute assigned to the online game is sufficient to handle the number of users accessing the region of the virtual location. Each compute assigned to the online game may have a predefined limit on the number of users that it can handle and this predefined limit may be based on the type and amount of resources that is available in the compute. To assist in providing game data to each of a plurality of users that are playing the online game, one or more computes may be provided to each virtual location in the gaming world where one or more users are present. Based on the analysis, when the number of users in a region within a particular virtual location exceeds the predefined limit for the assigned compute, the dynamic region creation engine 121 may divide the region in the particular virtual location into a plurality of sub-regions. Each sub-region is defined by a boundary within which at least one user of the region is present. The dynamic region creation engine 121 then interacts with the compute allocator 109 to assign additional compute to the region to assist in the processing of the gaming interactivity of the region. In some implementations, each sub-region is assigned distinct one or more computes to process the gaming interactivity of the user(s) in the sub-region and to generate game data for each user in the corresponding sub-region. The game data for each user includes the game state of the online game for the user, based on the interactivities provided by the user. The game data generated by the computes assigned to the sub-regions are assembled by one of the computes of the sub-regions or by the compute assigned to the region or the particular virtual location. The assembled game data is used to generate game state of the online game. A game state coordinator 121a is used by the dynamic region creation engine 121 to coordinate the game data of the different computes and to generate the game state for the online game.

The game state information and the user location information are forwarded by the dynamic region creation engine 121 to a user region assignment manager 125. The user region assignment manager 125 locally stores the current location of the users for the online game and shares the location information with a user data migration agent 127. The user data migration agent 127 uses the location information of each of the users to determine sequence of game data that needs to be provided to each user and forwards frames of game data to the respective user's client devices accordingly. The sequence of game data is determined by a game context processor 111.

The users' inputs within each virtual location are processed by the game context processor 111 by determining a current context of the online game and a processing sequence of the game data for each user. For instance, the processing sequence for each user may be determined a data prioritizer 111a based on visual field of view of each user, criticality of different portions of the game data, timing associated with the game data, etc. The data prioritizer 111a may determine the visual field of view of each user by examining the direction each user is facing during game play and/or the direction the user is progressing within the online game. If the user is progressing from the left side of the gaming world to the right side, the visual field of view would be the side the user is facing in the gaming world (i.e., the right side). As a result, the game data related to the gaming world in the right side of the user would be accorded a higher priority than the gaming world that is behind the user (i.e., on the left side of the gaming world) for the time the user is facing the right side. If, after overcoming the challenge on the right side, the user jumps around to tackle a challenge on the left side of the gaming world, the left side of the gaming world that is in the visual field of view of the user is accorded a higher priority during the time the user is facing the left side and at the same time the right side of the gaming world that is behind the user is accorded a lower priority. The game context processor 111 processes the gaming interactivity of each user using the processing sequence information provided by the data prioritizer 111a. As the online game receives inputs from a plurality of players (i.e., hundreds or thousands of players) at any given time, prioritizing the gaming interactivity of each user and processing portions of the gaming interactivity will reduce the amount of game data that is being generated by each compute assigned to the virtual location, thereby making efficient use of the assigned processing resources while ensuring the users are presented with appropriate game data in timely manner to enrich their game playing experience.

The processed game data of each user is forwarded to the user data migration agent 127 to assemble the game data for each user, encode the game data and stream frames of game data to the respective client devices of the users. The game data for each user is received at the user migration agent 127, assembled and transmitted in accordance to the processing sequence determined for each user. The processed game data is also stored in a data store 260 for determining user metrics and game data metrics of the online game, which can be used to categorize the user and to determine the type of computes that need to be assigned to the online game. As the users continue to interact with the online game, more users may move into the region within the particular virtual location or existing users may move out of the region in the particular virtual location. The dynamic region creation engine 121 and the game context processor 111 work together to ensure that the computes assigned to process game interactivity of users in each virtual location and each sub-region within a given virtual location, have sufficient resources to handle the processing load of the online game.

Figure 3B:
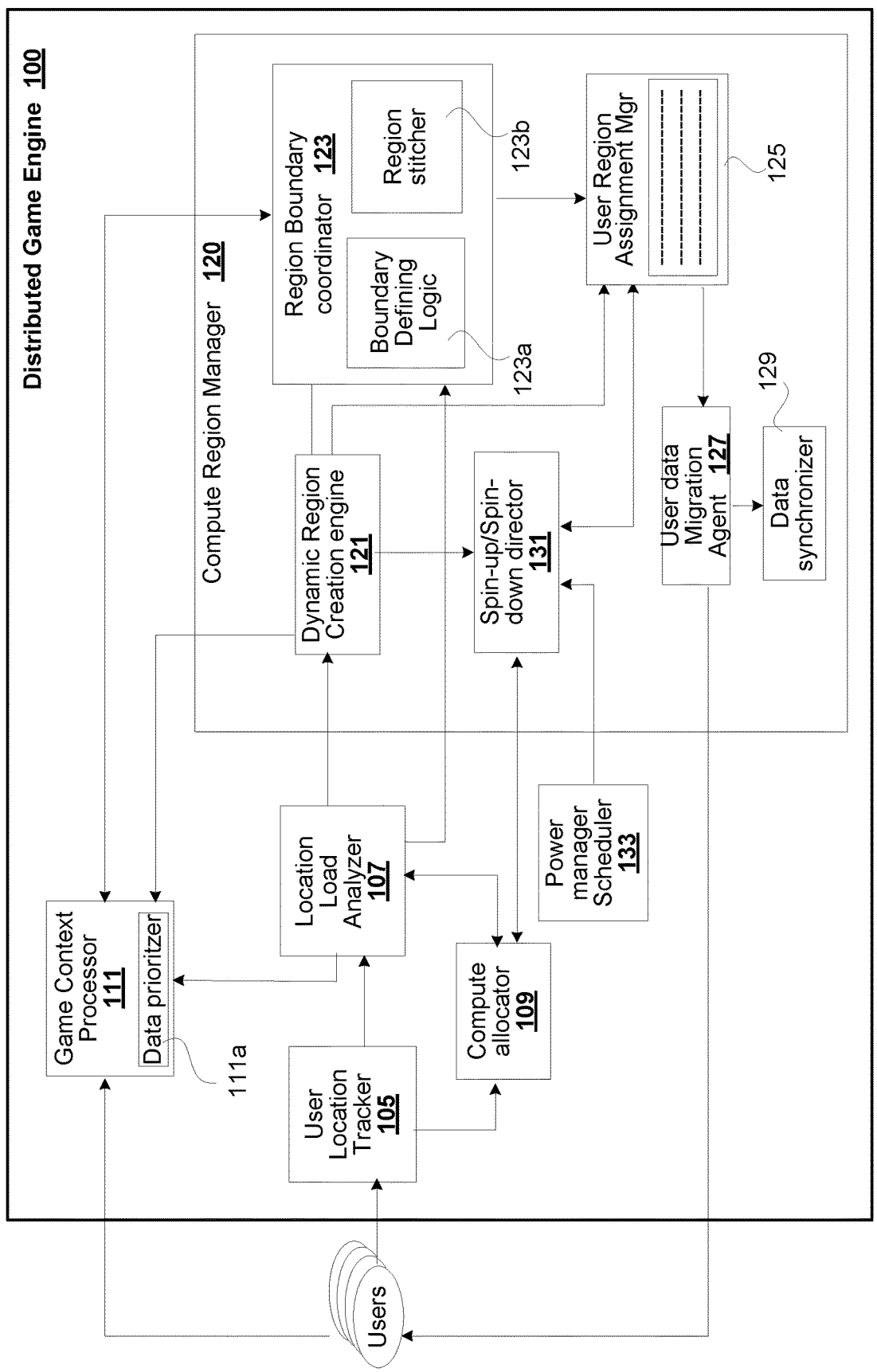
FIG. 3B illustrates a simplified block diagram identifying details of some of the components of a compute region manager module within the distributed game engine used in provisioning resources for an online game, in accordance to an alternate implementation of the present disclosure.

FIG. 3B illustrates the various components of the compute region manager 120 of the distributed game engine 100 that is used to track the virtual locations of the users within the gaming world of the online game, manage the computes allocated to the virtual locations within the gaming world, and to migrate game data of the users to the different computes, in an alternate implementation. In this implementation, the dynamic region creation engine 121 may interact with additional components within the compute region manager 120 to coordinate processing of gaming interactivity of users within the online game by generating sub-regions and by generating signals to spin-up or spin-down computes/computing resources for different virtual locations of the online game. Some of the components within the compute region manager 120 includes a dynamic region creation engine 121, region boundary coordinator 123, user region assignment manager 125, user data migration agent 127, data synchronizer 129, and spin-up/spin-down director 131, to name a few.

The distributed game engine executes game logic of a MMO game (i.e., online game) processing gaming interactivity received from a plurality of users and generates game data for the online game. As the online game is accessed by a plurality of users distributed across various geo locations, instances of the distributed game engine and game logic are executed on a plurality of servers within a game cloud system, and accessed by the users over a network 200, such as the Internet. A user location tracker 105 within the distributed game engine is used to monitor movement of the users with the virtual locations of the gaming world of the online game. The users may be identified within the virtual locations of the gaming world using a game object or an avatar. Different virtual locations may be defined for different levels of game play and the users may be identified in different virtual locations based on the level of game play and the progress made within the online game. The user location tracker 105 may analyze the game data generated during game play to determine the virtual location of each of the users of the online game and to detect when a number of users access a region within one virtual location of the gaming world.

Upon detecting a number of users in the region of a particular virtual location, a location load analyzer 107 of the distributed game engine 100 is used to determine if the number of users in the region exceeds a predefined limit defined for a compute assigned to process the interactivities generated within the virtual location identified in the gaming world. As each user moves around within the gaming world during game play, the number of users accessing the region of the particular virtual location may vary. As a result, the location load analyzer 107 constantly monitors the number of users that are present in the region of the particular virtual location to determine if the number of users exceeds the predefined limit for the compute assigned to the particular virtual location.

Information from the location load analyzer 107 and the user location tracker 105 are used by the compute allocator 109 to determine amount of compute required to handle the game data processing load in the particular virtual location. The compute allocator 109 may also determine the type and amount of computes that have already been allocated to the online game to process the game data generated at the different virtual locations identified in the gaming world. Using the information related to the amount of compute already allocated and amount of compute required for the online game, and the number of users accessing the region at a given time during the game play, the compute allocator may determine if the computes assigned to the online game is sufficient to handle the interactivities for the region of the virtual location and, therefore, the online game, or if any adjustments need to be made to the computes assigned to the online game. For example, currently assigned computes may not be sufficient to handle the interactivities of the number of users that have assembled in the region of the particular virtual location and additional computes may need to be assigned to handle the interactivities of the number of users in the particular virtual location. In such circumstances, the location load analyzer 107 may send a signal to the dynamic region creation engine 121 within the compute region manager 120 to assign additional computes to the particular virtual location.

Alternately, the computes currently assigned to the particular virtual location of the online game may be in excess of what is required for handling the number of users that have assembled in the region. As a result, some of the computes assigned to the virtual location may need to be de-assigned and the interactivities of the users migrated over to other computes that are assigned to the online game. The location load analyzer 107 may send a signal to the dynamic region creation engine 121 within the compute region manager 120 to assign additional computes to the particular virtual location. User location information from the user location tracker 105, compute information provided by the compute allocator 109 and location load information provided by the location load analyzer 107 are shared with the dynamic region creation engine 121.

The dynamic region creation engine 121 uses the signal from the location load analyzer 107 to adjust the computes allocated to the particular virtual location of the online game. As the online game is a MMO game with a plurality of players (i.e., users) accessing and playing the online game, each of the players may be progressing through the online game at their own speed. As a result, each of the players may be in different virtual locations of the online game. Consequently, different computes are assigned to the online game to allow the different computes to process the interactivities of the users in the corresponding virtual location. When the number of users accesses a specific region within the particular virtual location, there will be an increase in the interactivities in the region that the assigned compute may or may not be able to handle. When the currently assigned compute is unable to handle the number of users in the region of the particular virtual location, the dynamic region creation engine 121 divides the region into a plurality of sub-regions, with each sub-region having at least one user of the region. Each sub-region is defined to have a boundary within which the users of the sub-region are present. The dynamic region creation engine then interacts with the spin-up/spin-down director 131 to assign additional compute to the region. In some implementations, the spin-up/spin-down director 131 may assign the additional compute at a micro-level or a macro-level.

The users can be players or spectators. The players may be further classified into novice, mid-level or expert category. Similarly, spectators may be classified into spectators who follow the generic game play of the online game, or spectators who follow one of the types of players (expert, mid-level or novice). The dynamic region creation engine 121 may determine if the number of users assembled in the region within the particular virtual location is within a predefined limit for the compute assigned to the particular virtual location. If the number of users exceeds the predefined limit that is within a threshold percent (e.g., 5% or 10%), then the dynamic region creation engine 121 may send a signal to a spin-up/spin-down director 131 to adjust the compute at a micro-level. If, however, the number of users in the region of the particular virtual location exceeds the predefined limit for the compute by greater than a threshold percent, then the dynamic region creation engine 121 may send a signal to the spin-up/spin-down director 131 to adjust the computes at a macro-level. It should be noted that the dynamic region creation engine 121 may determine the type of users and the number of users of each type that have assembled in the region when adjusting the compute assigned to a particular virtual location of the online game.

The micro-level adjustment, in one implementation, may include adding additional CPU cores, GPU bandwidths if the GPU is shared, memory, or other computing resource components to the existing computes so as to allow the additional computing resources to assist in handling the game data at the particular virtual location. The aforementioned micro-level adjustment is one example and other forms of micro-level adjustment may also be carried out. The macro-level adjustment, in one implementation, may include adding additional server or a cluster of servers to the particular virtual location to assist in the processing of the game data generated therein. The additional server may be a physical server, a virtual server that executes using computing resources of a host, a container server, or any combinations thereof. The aforementioned macro level adjustment is one example and other forms of macro-level adjustment may also be carried out.

Once the sub-regions are created, the information related to sub-regions, such as virtual sub-boundaries used to define the sub-regions is shared with a region boundary coordinator 123. The region boundary coordinator 123 engages a boundary defining logic 123a and region stitcher 123b to identify and manage the users within each of the sub-regions created in the region of the particular virtual location. The boundary defining logic 123a uses the boundaries defining the sub-regions created within the region, boundaries of the regions in the virtual locations and boundaries of the virtual locations identified within the gaming world to determine if one or more users are present on a boundary separating two consecutive sub-regions or two consecutive regions or two consecutive virtual locations by interacting with the region stitcher 123b. The region stitcher 123b stitches the sub-regions within each region, regions within each virtual location, virtual locations within the gaming world by coordinating the game states of each user within the sub-regions, the regions and the virtual locations together to provide a seamless virtual world view of the gaming world of the online game. Information from the seamless virtual world view of the gaming world is used by the region boundary coordinator 123 to determine if any user is located on a boundary between any two sub-regions that were created within the particular virtual location or on a boundary between any two consecutively defined regions within a virtual location. For example, while creating the sub-regions, the dynamic region creation engine 121 tries to sub-divide the region within the particular virtual location such that most of the users within the region are included within the boundary of each sub-region. However, one or more of the users may fall on the boundary separating two consecutively defined sub-regions. Consequently, the region boundary coordinator 123 identifies those users that fall on the boundary between any two consecutive sub-regions and coordinates game state synchronization for those users between the computes that are assigned to the respective sub-regions, so that the users that are present on the boundary are provided appropriate game state of the online game.

Information from the virtual world view provided by the region boundary coordinator 123 is used by the user region assignment manager 125 to identify the sub-regions and/or the virtual locations to which each of the users belong and store this information locally for use during the game play. As the users move around in the gaming world, the location of the users constantly changes and the changes related to each user are updated by the region assignment manager 125 as and when the change is detected. The current location of the user is also shared by the user region assignment manager 125 with a user data migration agent 127 and spin-up/spin-down director 131. The spin-up/spin-down director 131 obtains the current location of each user within the gaming world, identifies the computes assigned to the corresponding virtual location/sub-region by querying the compute allocator 109, and sends a signal to the compute allocator 109 to spin-up additional compute for each sub-region. The additional compute provisioned to the particular virtual locations is used along with the previously provisioned compute to process the gaming interactivities generated by the users within each sub-region.

In other implementations, some of the sub-regions and/or virtual locations may be re-set by merging them together to form a refined sub-region/virtual location. For instance, a region within a particular virtual location of a gaming world may have been sub-divided into a plurality of sub-regions with each sub-region assigned a distinct compute to process the gaming interactivity generated by the users that are present in the sub-region. During game play, when one or more users that was within a first sub-region move out of the first sub-region into a second sub-region or to a different region or different virtual location, the compute assigned to the first sub-region may be under-utilized or idle. In order to optimize the computing resources assigned to the online game, the computes assigned to the one or more sub-regions may be re-assigned by re-setting the one or more sub-regions of the particular virtual location. The re-setting of the one or more sub-regions may include merging a first sub-region with a second sub-region to generate a combined sub-region and the compute assigned to the first sub-region is assigned to the combined sub-region and the compute assigned to the second sub-region is re-assigned to some other sub-region, virtual location or to another online game. Similarly, when the region within a particular virtual location is sub-divided into a plurality of sub-regions, with only some of the sub-regions having users during game play, the computes are assigned such that a compute assigned to one of the sub-regions that includes users is also assigned to the sub-region that does not include any users. For instance, in the example shown in FIG. 4C, each of the first three sub-regions that include one or more users are assigned a distinct compute and the fourth sub-region that does not include any users is assigned the compute of the virtual location or of one of the sub-regions.

When one or more of the users from a first sub-region move out of the first sub-region into a second sub-region, the compute assigned to the second sub-region may be assigned to handle the excess processing load resulting from the one or more users moving into the second sub-region. Due to the movement of the users from the first sub-region, the first compute may become idle or under-utilized. As a result, the first compute may be re-assigned to a different virtual location or online game by merging the first sub-region with the second sub-region and allowing the second compute to handle the processing load resulting from the gaming interactivities at the combined sub-region. The spin-up/spin-down director 131 is used to determine the processing load that each compute can handle, the extent to which each of the computing resources of a compute can be stretched, and which compute/computing resource needs to be put into active use, and which compute/computing resource to reduce or made inactive. In some implementations, the spin-up/spin-down director 131 may signal to add or reduce the computes assigned to the online game based on cost or demand. For example, the spin-up/spin-down director 131 may interact with a power manager scheduler 133 to determine which computes to keep active and which ones to make inactive and such determination may be made based on cost of power. For instance, if at a certain time, the cost of power is high, then the power manager scheduler 133 may signal to the spin-up/spin-down director 131 to maintain the compute(s) assigned to a virtual location or sub-region and to stress the assigned compute(s) more instead of assigning additional computes to handle the processing load of the virtual location or sub-region. Similarly, if the cost of power is low at other times, then the power manager scheduler 133 may signal to the spin-up/spin-down director 131 to add additional computes to provide more processing power to handle the processing load of a virtual location or sub-region. Thus, the power manager scheduler 133 is used to ensure that the computes provided to the different virtual locations of the gaming world of the online game are optimally provisioned and utilized so that the allocated resources can handle the processing load efficiently while at the same time being cost-effective.

Once the computes are assigned to the different sub-regions and/or the virtual locations, the user data migration agent 127 is used to migrate the relevant gaming interactivities related to the different users to corresponding ones of the computes assigned to the respective sub-regions/virtual locations. Migrating the gaming interactivities of the different users include migrating game state of the online game of the user to the corresponding compute assigned to the sub-region or virtual location in which the user is present. Migrating the game state of the online game includes migrating the physics state, the rendering state, any damage information connected within gaming world, and any other game play data of the online game of the one or more users, from one compute to another compute. For instance, if sub-regions have been created within a region of a particular virtual location, the game state and the gaming interactivities of the users present in the respective sub-regions need to be migrated from the compute assigned to the region or particular virtual location to corresponding computes assigned to the different sub-regions. The gaming interactivities may be migrated to the appropriate computes by migrating portions of the interactivities based on priority accorded to each portion, wherein the priority accorded to a portion may be based on timing, importance, criticality, need, field of view for each user, etc., associated with the interactivities. For instance, when a gaming world includes a big explosion of a game object caused by a user's interaction with the game object, the portion of the interactions for the user related to the explosion needs to be migrated first so that the interaction of the user is processed first and the game data related to the explosion is presented to the user. Other interactions of the user may be migrated later in accordance to priority accorded to the other interactions. Information related to processing priority accorded to different gaming interactivities of each user may be provided by a game context processor 111. The processing priority is used to optimize data processing by the computes so that the computing resources are used in an efficient manner while ensuring that each user is presented with appropriate game data in a timely manner.

The game context processor 111 receives the location information of the users and the virtual locations defined in the gaming worlds of the online game from the region boundary coordinator 123 and process the interactivities of each user. In some implementations, the game context processor 111 engages a data prioritizer 111a to prioritize processing of the interactivities of each user. The data prioritizer 111a may process the interactivities related to gaming world based on relative context so that the game data provided for the user includes gaming content that is presented in order of relevance to the user. For instance, portion of game data related to gaming world within a visual field of view of a user, such as the game object explosion from the above example, may be provided first and other gaming content that is outside the visual field of view for the user is provided later. The game context processor 111 processes different portions of the game data associated with each user in order of relevance and provides the same to the user data migration agent 127 so that the user data migration agent 127 may encode and forward the different portions of game data in the order of relevance to the respective client device of each user.

In the situation where a user is present on a boundary between two consecutive sub-regions or on a boundary between two consecutive regions within a virtual location, a data synchronizer 129 is used to synchronize the data between the two or more computes assigned to the two consecutive sub-regions/regions for users. For instance, if a first compute is assigned to a first sub-region and a second compute is assigned to a second sub-region, then the game data (including the game state) of the user present on the boundary of the first and the second sub-regions, is synchronized between the first compute and the second compute. The data synchronizer 129 identifies the first and the second computes assigned to two consecutive sub-regions/regions and generates a synchronization signal to the first and second computes to allow them to synchronize the game data associated with the user. The game data synchronization for the user follows the priority accorded to the different portions of the game data and the synchronized data is forwarded to the client device of the user by the user data migration agent 127.

User location information and compute assignment is stored in user profile of each user accessing the online game. When new users access the online game and enter a particular virtual location within a gaming world of the online game, the user profile information along with the compute assignment is used to by the distributed game engine 100 to assign the new users to appropriate computes for handling the game data generated by the new users.

In some implementation, the distributed game engine may train an artificial intelligence (AI) model to determine the type and amount of computes required for different levels of the online game and for different users, based on the game state of the online game of different users, types and amount of inputs provided by the users in different virtual locations, expertise levels of the users, etc., and the compute region manager 120 of the distributed game engine may use the information included in the AI model to identify and provision the required computing resources for different virtual locations of a gaming world, wherein the computing resources can be provisioned at a micro-level or macro-level.

The game state provides the intricacies of the game play of the online game at a particular point of time. The game state, for example, may include game characters, game objects, game object attributes, game attributes, game object state, graphic overlays, etc. The game state also includes state of every device or module or component of the network of servers used in the execution of instances of the online game, such as CPU, GPU, memory, register values, program counter value, programmable DMA state, buffered data for the DMA, audio chip state, CD-ROM state, available communication bandwidth, etc., used for generating and processing game play data for rendering. The game state also identifies parts of the executable code of the online game that is currently executing and parts of the executable code that needs to be loaded for continuing game play. The game state may also include saved data of each user, including user profile of a player, user customizations to game objects, game type, game level/difficulty selected by the player, amount of game tools, winnings, points, cash, awards, etc. The game state may also include randomly generated features or AI overlays or game intricacies that are useful in understanding the game details associated with game play of the online game. The game state and other relevant game-related data provides comprehensive details from which processing load of the online game can be easily estimated.

The online game executed on the game cloud system may be a massive multiplayer online (MMO) game and the game server assigned to the online game may include an instance of a multi-player distributed game engine that communicates with game logic of the online game to capture activities of the players (i.e., users) and use the players' activities to generate game data of the online game for each player. The game logic is configured to manage game states for each of the players during a MMO game session and provide the game states to the distributed game engine, which provides functional components to process the different features of the online game, such as game physics, shading, scripting, texturing, audio, animation, memory management, scene graph, assembling, encoding, etc., for the game data generated for each player or spectator participating in the MMO game session.

The distributed game engine 100 includes a plurality of process engines or components to enable parallel processing of the different features of the game data generated in response to users' inputs provided during game play of the online game. Thus, instances of the distributed game engine 100 along with instances of game logic are executed on a plurality of servers within a game cloud system (GCS) during a game play session of the online game so as to allow the distributed game engine to process the game data in a fast and efficient manner. As the users play the online game, users' inputs are gathered and processed to affect a game state of the game and generate game play data for transmitting to the client devices of the users. The game state of the online game is analyzed to identify user metrics of the user and game state metrics of the online game. The user metrics is updated to user data of the user. Similarly, the game state metrics of the online game is updated to the game data of the online game. The user metrics and game state metrics are used in prioritizing the game data generated by different users during game play and forwarded to the respective users' client devices.

The various components of the distributed game engine 100 are used to determine the types of resources and amount of each type of resources required for processing the game data generated in each virtual location of the gaming world for the online game. The determination is based on game state of the online game for each user, the user inputs and the processing criteria defined for the online game. For example, the processing criteria may indicate that certain portions of the game data of players have to be prioritized higher than certain other ones of the game data. Based on the determination, the game context processor 111 processes the different portions of the game data and the spin-up/spin-down director provisions the computing resources or computes to the different virtual locations identified in the gaming world for the online game so that the game of the online game is processed in a fast and efficient manner for each and every player.

Generally speaking, a game engine is a software layer that serves as a foundation for a game, such as MMO game, and provides a framework that is used to develop the online game. The game engine abstracts the details of doing common related tasks (i.e., game engine tasks) required for every online game, while the game logic of the corresponding online game provides the details of how each online game is to be played. The game engine framework includes a plurality of reusable functional components for processing core features for the online game that bring the online game to life. The basic core features that are processed by the game engine may include physics (e.g., for collision detection, collision response, trajectory, movement of object based on gravity, friction, etc.), graphics, audio, artificial intelligence, scripting, animation, networking, streaming, optimization, memory management, threading, localization support, and much more. The reusable components include process engines that are used to process the core features identified for the online game. During game runtime, the game engine manages the game logic of the online game, manages the allocation and synchronization of the functional portions of the game engine to process game data, in an optimal manner, and generates frames of game data that is transmitted back to the client devices for rendering. A variety of game engines that are currently available provide different core functionalities and an appropriate game engine may be selected based on the functionalities that are available for executing the online game.

In some implementations, instances of the game engine and game logic are distributed across a plurality of servers with each server executing a certain functional portion of the game engine. The different servers may process the game data in parallel by executing the different instances simultaneously. In this manner, the distributed game engine allows for faster and efficient processing of the game data. The game engine is configured to process a plurality of functional portions that are needed for bringing the online game to life. Each online game developed for an MMO game environment may identify different functional portions of the game engine that are required for the online game to function.

The functional portions may be identified by the developer of the online game or may be determined by analyzing game logic of the online game. Based on the online game's specification requirements, each game engine instance executing on a server (i.e., interchangeably referred to as "compute") engages a specific process engine of the distributed game engine to process a functional portion that relates to a specific feature of the game data generated from game play of the online game. The instances of the game engine provide iterative processing of the game data by having the output from a first server (i.e., a result from the processing of a functional portion) acting as an input to a second server, the output from the second server acting as an input to a third server (or to a first server), and so on. In some implementations, a single server may be assigned for executing an instance of the game engine and game logic used to process a specific functional portion of the game engine. In other implementations, a plurality of servers, each executing an instance of the game engine and game logic, may be assigned to process a specific functional portion. The plurality of servers may be identified and assigned based on the amount of processing data generated at a virtual location. Since the game engine and game logic are instantiated on a plurality of servers for processing different functional portions of the game engine required for bringing the online game to life, the game engine is said to be "distributed". Thus, any reference to distributed game engine used in this application refers to this configuration where the game engine and corresponding portion of the game logic is instantiated on multiple servers.

The game data that is output from the different servers are synchronized, assembled, encoded and transmitted to the respective ones of the client devices for rendering. To assist in the assembling of the game data, the game engine may include a synchronization engine to synchronize the distribution of the various functional portions of the game engine to different servers, synchronize the processing of the different functional portions of the game engine assigned to different servers, and route the processed results between the servers and between the servers and a user migration agent. The user data migration agent of the distributed game engine is used to keep track of servers (i.e., computes) that are being used to process a particular user's game data, and collect the output game data from the different servers/computes, assemble the output game data for each user, encode and forward the encoded game data to different client devices for rendering.

When the distributed game engine uses an AI model to determine the type of computes/computing resources needed to process the game data, the distributed game engine may use machine learning algorithm to populate a neural network of nodes of the AI model using information from the game data of the online game generated during prior game play sessions. The machine learning algorithm may include classifiers that are used to provide output to generate/refine the AI model. Each classifier may have an engine/module that is configured to identify and process a specific feature of the game data generated at a particular virtual location or a sub-region identified in the gaming world, and update a node of the AI model with information related to the processing load and the type, amount of resources used for processing the specific feature. The processed information is forwarded along with the game data downstream to other classifiers for further processing. Output from the AI model is used in provisioning computes/computing resources to the online game, in determining if existing computing resources or server computes are sufficient to process the game data, or if adjustments to the servers/server resources need to be made for optimal processing of game data of the online game.

The spin-up/spin-down director 131 is used to dynamically adjust the computes/computing resources assigned to each virtual location of the gaming world of the online game and to assign the gaming interactivities related to different users to the appropriate computes/computing resources so that the interactivities of each user can be processed efficiently and the generated game data transmitted to the client devices of the users for rendering, in a timely manner. The game data provided to each user include the respective user's own perception of the gaming world. For users who are spectators, the game data provided to a spectator may include their own perception of the online game or the perception of the player that a spectator is following. When new users join a game session, the distributed game engine system configuration is used in routing the new users, so that the users (i.e., existing users and new users) of the online game can have a satisfying game play experience.

Various types of servers can be provisioned for executing instances of a distributed game engine and game logic of the online game and for processing the game data generated for the online game, in some example implementations. The server can be a physical server. The physical server (or simply "server") may be a stand-alone server or may be part of a data center within the game cloud system. The server in the data center may be an independent server with in the data center or be part of a rack, with each rack containing multiple server computing devices. The physical server includes the necessary resources, such as operating system, memory, microprocessor for executing one or more applications and/or one or more functional portions of the game engine. The applications or functional portions of the game engine are stored in the memory, processed using the microprocessor and managed by the operating system.

Alternately, the server could be a virtual machine that is part of the game cloud system. The game cloud system may include a plurality of virtual machines (VMs) running on a hypervisor of a host machine, with one or more virtual machines configured to support game processors that execute an instance of an online game utilizing the hardware resources available to the hypervisor of the host. When a plurality of game processors associated with a plurality of virtual machines execute instances of the online game, the users' inputs are collected, organized by one or more back-end servers (i.e., physical servers or virtual servers) of the game cloud system and processed to affect game state of the online game. The game data, generated for the online game in response to the users' inputs, are assembled, encoded and forwarded as streaming frames of game data to the users' client devices for rendering. In the case where the AI model is used by the distributed game engine to provision the computes and computing resources, the users' inputs are also used to generate training data for training the AI model. Each of the virtual machine may include one or more applications (e.g., one or more online game applications), that is executed by an operating system using the hardware resources available to the virtualization layer (i.e., hypervisor) of the host machine.

In another alternate implementation, the server could be part of a cloud container that allows an application, such as the online game application, and all its dependencies, libraries, and configuration files that are needed to run the online game application, to be bundled together into a virtual container (or simply referred to henceforth as "container") with the application using the allocated resources within the container to run the application. The container operates without a full operating system, thereby providing an operating system-level virtualization. The container is capable of operating with minimum amount of resources to perform a task, such as executing an instance of a game engine and game logic for an online game, wherein the resources (i.e., physical hardware resources) are virtualized. The cloud container is portable as it can be fully deployed to different servers. In one implementation, the container provides application isolation through process and namespace isolation technology by sharing a kernel with the container host. In an alternative implementation, the kernel of the container host is not shared, thereby providing enhanced isolation by running the containerized application from a virtual machine. The aforementioned types of computes (i.e., servers) are provided as mere examples and should not be considered restrictive. Other forms of servers or computes (i.e., computing devices) that provide the resources for instantiating a game engine and game logic may also be used.

In some implementations, users may connect to the online game application of the cloud game system from anywhere in the world. The online game application enables such connection by initiating multiple game instances on different servers of different data centers distributed across the world. The users' inputs generated at the respective client devices during game play of online game are collected from the network of servers and game data is generated. The game data is returned as frames of game data to the respective client devices, using any one of network models. Some examples of network models that may be used to communicate between servers of the game cloud system described in this application include a TCP/UDP network model or International organization of Standardization (ISO) based open system interconnection (OSI) network architecture. The data processing and communication between the distributed servers may follow any one of a plurality of existing protocols. The ISO model includes a set of application layers (Application layer, Presentation layer, Session layer) and data flow layers (transport layer, network layer, data link layer and physical layer). The application layers are configured to identify the transmitting and receiving entities, transfer data of an application, such as the online game, between the transmitting and receiving entities in a manner that is understood by the respective entities, and to manage and synchronize communication between the transmitting and receiving entities with minimal data loss. The data flow layers are configured to determine if data transmission should be carried out in sequential or parallel path, a protocol that is to be followed for packetizing the data, assembling the packetized data into frames and transmitting the frames of data along a preferred route. It should be noted that the above mentioned description provides only an overview of the ISO model used in communicating the data through the network of servers for the online game and that the finer details of the role of the various layers are understood by one skilled in the art, and is therefore not described in greater detail.

Figure 5:
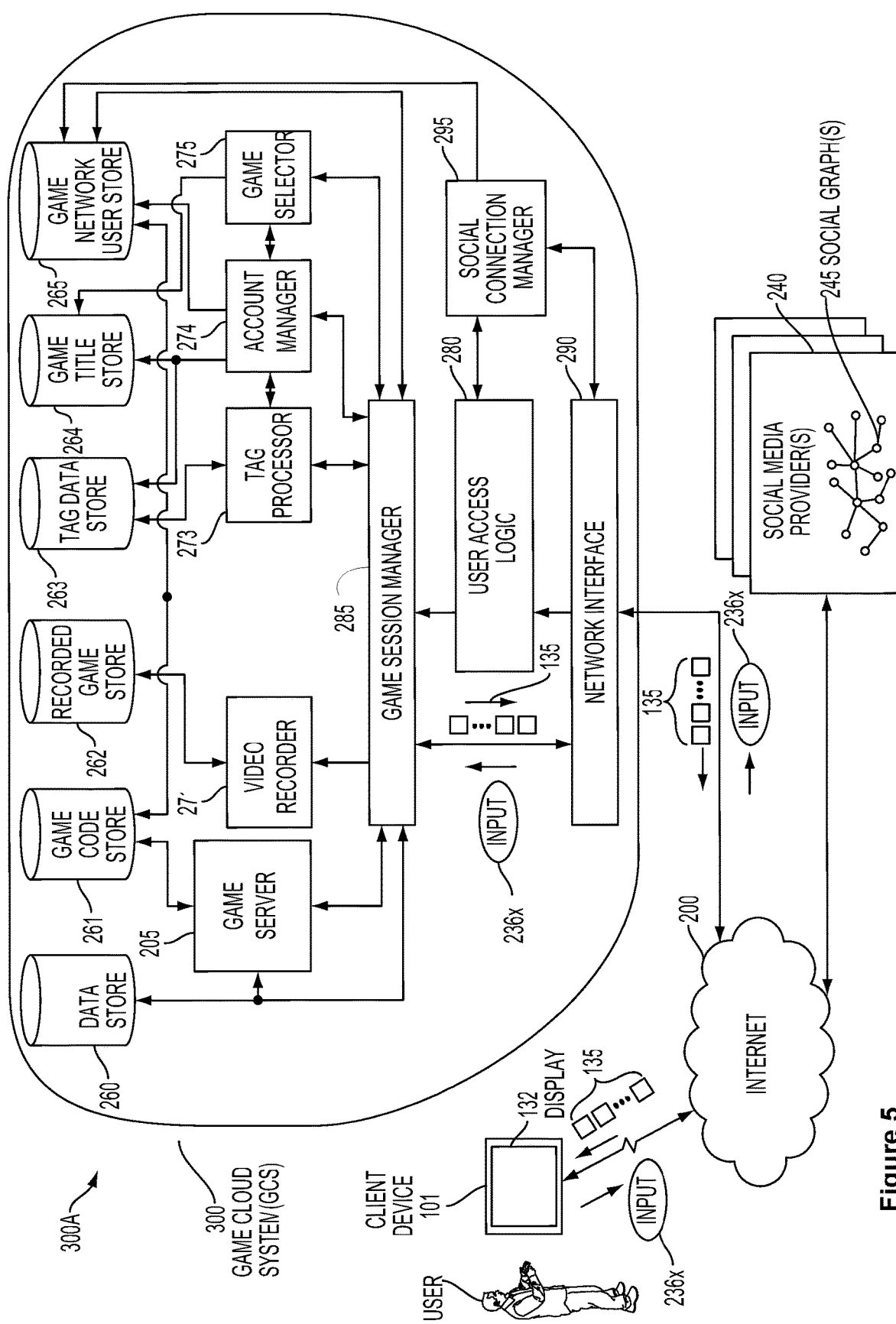
FIG. 5 illustrates a system diagram of a cloud gaming system used for executing an online game in order to provide frames of game data to one or more client devices over a cloud game network, in accordance with one implementation of the present disclosure.

FIG. 5 illustrates an overview of an example system 300A supporting the collection of user inputs to update game data and using the updated game data to build and/or train AI model relating to game play of an online game, in accordance with one implementation of the present disclosure. In particular, system 300A enables accessing and playing of video games stored in a game cloud system (GCS) 300. Generally speaking, game cloud system GCS 300 may be a cloud computing system operating over a network 200 to support a plurality of players playing an online game application through corresponding game plays. Data related to those game plays may be used for building and/or training an AI model relating to game plays of the online game application. In particular, system 300A includes GCS 300, one or more social media providers 240, and a plurality of client devices 101, all of which are connected via a network 200 (e.g., Internet). The plurality of client devices associated with a plurality of users may be connected to network 200 to access services provided by GCS 300 and social media providers 240. The users may be players or spectators that follow game play of a particular player or of the online game.

In one embodiment, game cloud system 300 includes a game server 205, a video recorder 271, a tag processor 273, and account manager 274 that includes a user profile manager, a game selection engine (i.e., game selector) 275, a game session manager 285, user access logic 280, a network interface 290, and a social connection manager 295. GCS 300 may further include a plurality of storage systems, such as a game state store, user accounts, user data store, etc., which may be stored generally in datastore 260. Other game storage systems may include a game code store 261, a recorded game store 262, a tag data store 263, video game title store 264, and a game network user store 265. In one embodiment, GCS 300 is a system that can provide online game applications, services, gaming related digital content, and interconnectivity among systems, applications, users, and social networks. GCS 300 may communicate with users' client devices 101 and social media providers 240 through social connection manager 295 via network interface 290. Social connection manager 295 may be configured to relate one or more friends. In one embodiment, each social media provider 240 includes at least one social graph 245 that shows user social network connections.

A player (i.e., user) is able to access services provided by GCS 300 via the game session manager 285. For example, account manager 274 enables authentication and access to game titles on the GCS 300, for a player. Account manager 274 stores information about users (players, spectators) and manages the user profile for each user. User information can be used by the account manager 274 for authentication purposes. Additionally, game titles owned by a user may be managed by account manager 274. For example, video games stored in game title store 264 are made available to a user who owns or is provided access to those video games.

In one embodiment, a user can access the services provided by GCS 300 and social media providers 240 by way of client device 101 through connections over network 200. Client device 101 can include any type of device having a processor and memory, wired or wireless, portable or not portable. In one embodiment, client device 101 can be in the form of a smartphone, a tablet computer, or hybrids that provide touch screen capability in a portable form factor. One exemplary client device can include a portable phone device that runs an operating system and is provided with access to various applications (apps) that may be obtained over network 200, and executed on the local portable device (e.g., smartphone, tablet, laptop, desktop, etc.).

Client device 101 includes a display 132 that acts as an interface for user to send input commands 236 and display data and/or information 135 received from GCS 300 and social media providers 240. Display 132 can be configured as a touch-screen, or a display typically provided by a flat-panel display, a cathode ray tube (CRT), or other device capable of rendering a display. Alternatively, the client device 100 can have its display 132 separate from the device, similar to a desktop computer or a laptop computer.

In one embodiment, client device 101 is configured to communicate with GCS 300 to enable user (player) to play a video game. For example, player may select (e.g., by game title, etc.) a video game that is available in the game title data store 264 via the game selection engine 275. The selected video game is enabled and an instance of the video game is loaded for execution by game server 205 on the GCS 300. In one embodiment, game play is primarily executed in the GCS 300, such that client device 101 will receive a stream of game video frames 135 from GCS 300, and user input commands 236 for driving the game play is transmitted back to the GCS 300. The received video frames 135 from the streaming game play are rendered on display 132 of client device 101.

In one embodiment, after the player chooses an available game title to play, a game session for the chosen game title may be initiated by the player through game session manager 285. Game session manager 285 first accesses game state store in data store 260 to retrieve the saved game state of the last session played by the player (for the selected game), if any, so that the player can restart game play from a previous game play stop point. Once the resume or start point is identified, the game session manager 285 may inform game execution engine in game server 205 to execute the game code of the chosen game title from game code store 261. After a game session is initiated, game session manager 285 may pass the game video frames 135 (i.e., streaming video data), via network interface 290 to a client device, e.g., client device 100.

During game play, game session manager 285 may communicate with game server 205, recording engine in the video recorder 271, and tag processor 273 to generate or save a recording (e.g., video) of the game play or game play session. In one embodiment, the video recording of the game play can include tag content entered or provided during game play, and other game related metadata. Tag content may also be saved via snapshots. The video recording of game play, along with any game metrics corresponding to that game play, may be saved in recorded game store 262. Any tag content may be saved in tag data store 263.

During game play, game session manager 285 may communicate with game server 205 to deliver and obtain user input commands 236 that are used to influence the outcome of a corresponding game play of the video game. Input commands 236 entered by player may be transmitted from client device 101 to game session manager 285 of GCS 300. Input commands (e.g., controller inputs or user inputs) 236, including input commands used to drive game play and user interactive input, such as tag content (e.g., texts, images, video recording clips, etc.). Game input commands as well as any user play metrics (how long the user plays the game, etc.) may be stored in game network user store. Select information related to game play for the video game may be used to enable multiple features that may be available to the user.

Accordingly, the present disclosure describes systems and methods for implementing an algorithm to identify virtual locations within a gaming world of an online game, and provision computes and computing resources to handle processing load at each virtual location to ensure efficient processing of the online game.

Figure 6:
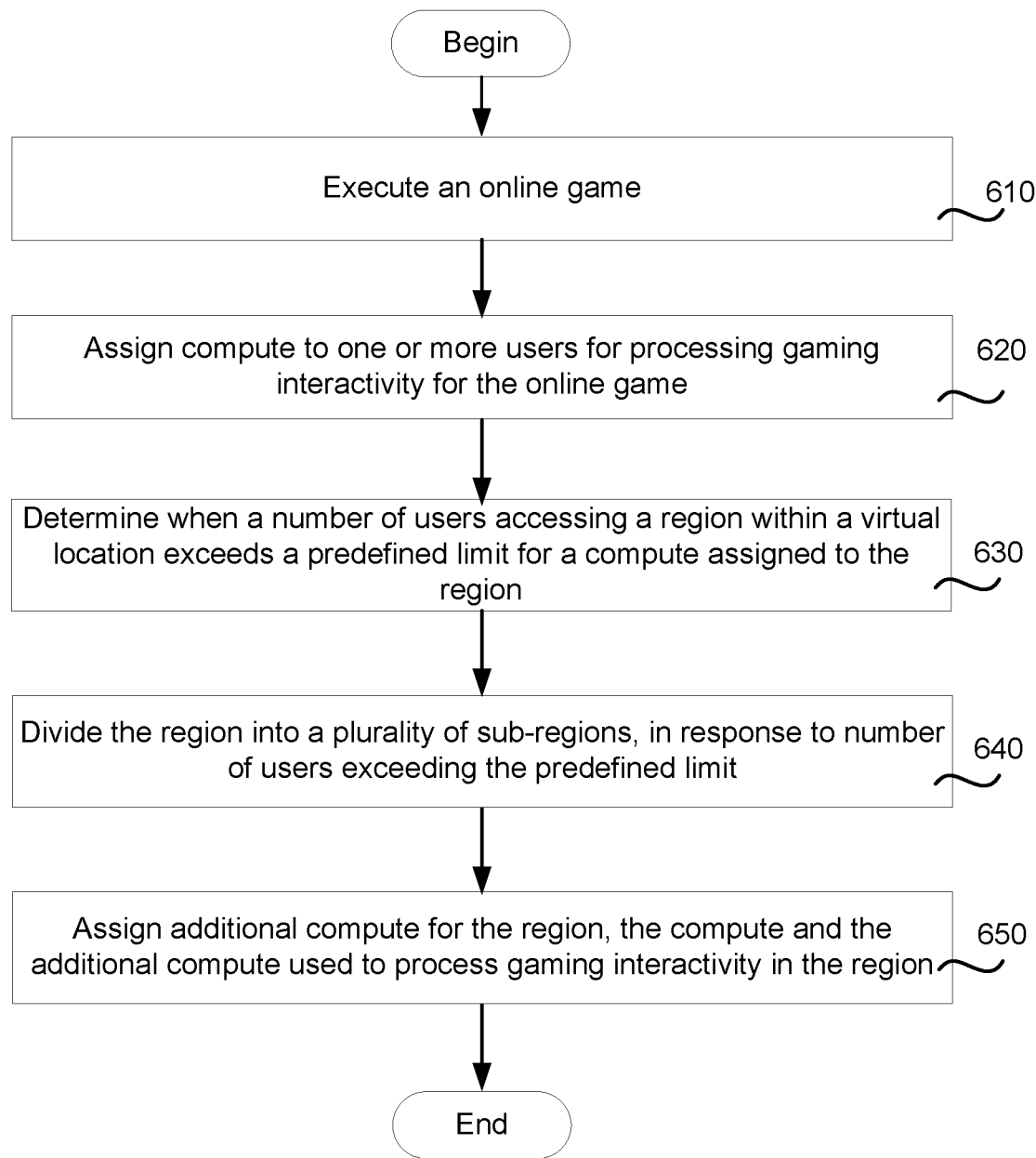
FIG. 6 illustrates flow operations of a method for provisioning resources for the online game, using a resource allocation model, in accordance with one implementation of the present disclosure.

FIG. 6 illustrates a sample operations flow of a method for managing processing resources for an online game that present a gaming world, in accordance with one implementation. The method begins at operation 610 wherein the online game is executed for one or more users. One or more instances of the online game may be executed in response to a plurality of users accessing the online game for game play. Each of the one or more users is provided access to virtual locations defined in the gaming world of the online game. A compute is assigned to process gaming interactivity of one or more users in the gaming world, as illustrated in operation 620. A distinct compute may be assigned to process gaming interactivity generated by users that are present in each virtual location of the gaming world. The compute assigned to each virtual location may include a predefined limit on the number of users that the assigned compute can handle. The predefined limit may be based on the amount of gaming interactivity generated by the users, wherein the gaming interactivity includes user inputs provided by users, such as players, during game play.

The movement of the users in the online game is monitored and a number of users accessing a region within a particular virtual location within the online game is determined. When the number of users in the region exceeds a predefined limit for the compute assigned to the particular virtual location, as illustrated in operation 630, the region is dynamically divided into a plurality of sub-regions, as illustrated in operation 640. The number of sub-regions that is created for the region may be based on the density of the users in the region and on division criteria used by the distributed game engine. The sub-regions are created with defined boundary, such that each of the sub-regions includes at least one user of the region. In some implementations, the entire portion of a region is divided into sub-regions. In other implementations, depending on where the users are assembled within the region, a portion of the region within the particular virtual location is sub-divided into sub-regions, while the remaining portion of the region is treated as a separate sub-region. In such implementations, the sub-regions that were created in the portion of the particular virtual location may each have one or more users of the particular virtual location while the remaining portion may or may not include any users.

After dividing the region into sub-regions, additional compute is assigned to the region so that the assigned compute and the additional compute process the gaming interactivity for the users in each of the sub-regions, as illustrated in operation 650. In some implementations, distinct compute is assigned to each sub-region with each distinct compute configured to process the gaming interactivity of the users in the sub-region. The processing of the compute and the additional compute assigned to the region are coordinated to generate game state of the game for each user. The game state of the game along with game data for each user is forward to respective client device of each user. The game data for each user includes the user's perception of the gaming world of the online game and such perception is determined based on game state of the online game.

Thus, the distributed game engine provides ways to track movement of the users within a gaming world and proactively take action in real-time to provision computes/computing resources to handle the processing load of each virtual location/regions within each virtual location during online game play so as to ensure that each virtual location/region within each virtual location are provided with required computes/computing resources to handle the processing load generated within. The action may include generating sub-regions within a region, or sub-regions within a sub-region, or re-setting two or more sub-regions based on the number of users in the sub-regions/regions within the virtual locations, and assigning/de-assigning computes/computing resources accordingly. The dynamic assigning/de-assigning of the computes/computing resources to the online game ensures optimal use of the computes/computing resources while the game data is generated for each user in a fast and efficient manner.

The proactive tracking and provisioning allows a user from one time zone to join game play of the online game with other users, such as their friend circle, in another time zone in a seamless manner without the user being subjected to queue or latency. The game play of the online game is serviced by different computes/computing resources assigned to different virtual locations identified in the gaming world so as to provide game data to each user that includes each user's own perception of the gaming world. The computes/computing resources assigned to the virtual location may be provisioned from different data centers and the game data is synchronized, processed, assembled and transmitted with minimal latency. Of course, the processing and transmitting of game data between the computes and between the computes and the client devices that are located in different time zones have to take into consideration the time delay due to the transmission distance of the computes, client devices and may have to provide additional bandwidth for transmitting or prioritizing the game data according to the available bandwidth so as to make it appear that the game data is being presented to the users in real-time.

The information related to the location of the users may be obtained from user region assignment manager and used by the spin-up/spin-down director 131 to provision the computes/computing resources, and by the data synchronizer 129 to synchronize the data of the users. The data synchronizer 129 prioritizes the processing of the users' interactions in the virtual location to generate game data, based on the context of the game play and based on information provided by the data prioritizer 111*a* so that the users are provided with their own perspective of the online game, in a timely manner Since each player requires their own perception of the online game, it is more efficient to provision separate computes/computing resources to handle processing data generated in each virtual location, so that the computes/computing resources are not stretched too thin. The sub-regions created within a region of a virtual location are defined such that the bulk of the users are within the boundary of each sub-region. The computes assigned to the virtual locations are configured to parallelize the processing of the game data generated for the users in a constantly changing space.

The various implementations described herein describe a deterministic way of spreading out the computations when a large number of players enter the same virtual location within a gaming world of the online game at a given time. The computes/computing resources assigned to different virtual locations are elastically scaled up or down, based on the processing needs at the corresponding virtual locations, thereby ensuring that the computes/computing resources are used effectively. The sub-division of the virtual locations and distribution of the computes/computing resources are based on the density of users (represented by characters/game objects/avatars) within each virtual location in the gaming world.

Figure 7:
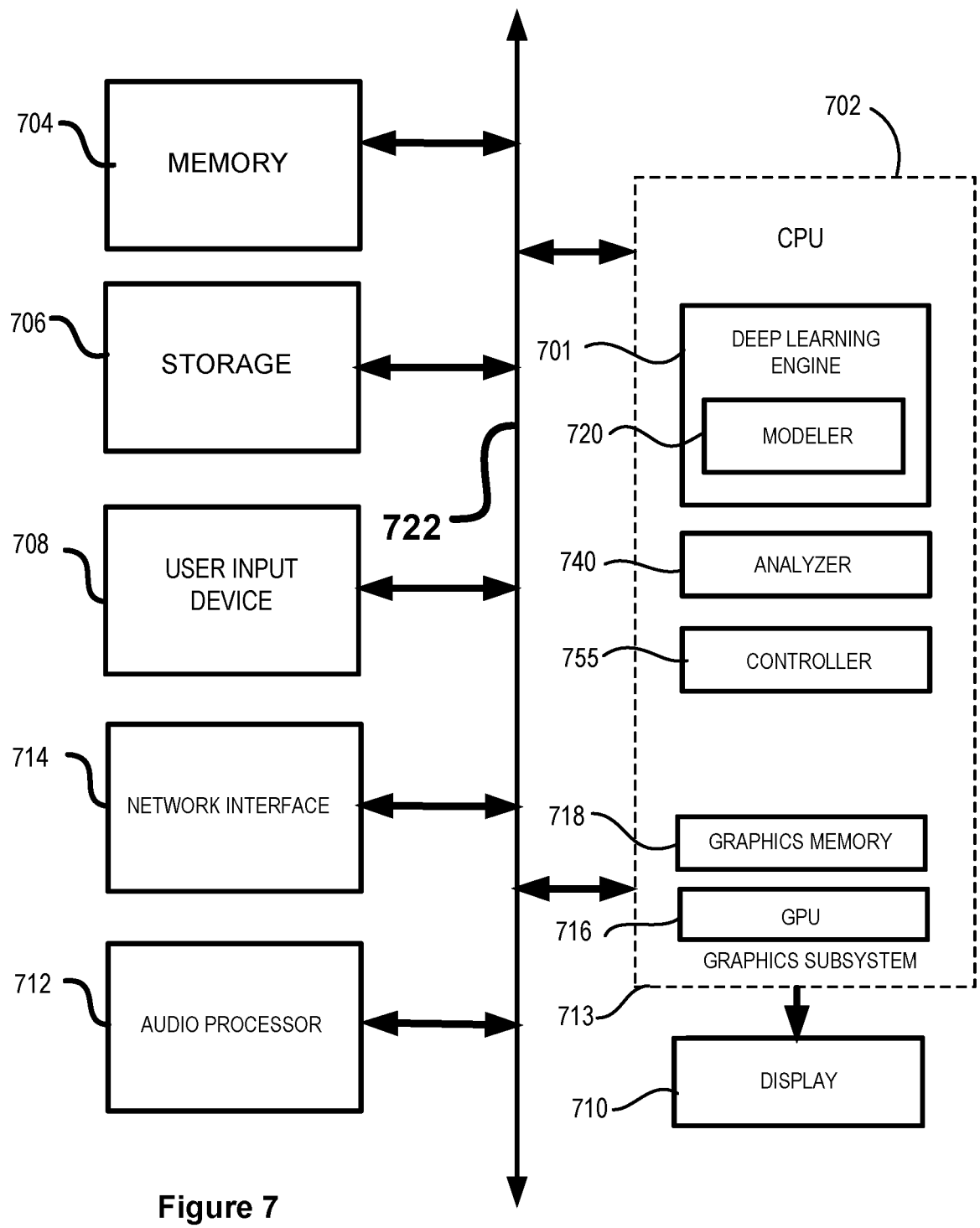
FIG. 7 illustrates components of an example computing device used for building and training a resource allocation model (artificial intelligence (AI) model) using a modeler, in accordance with one implementation of the present disclosure.

FIG. 7 illustrates components of an example device 700 that can be used to perform aspects of the various embodiments of the present disclosure. For example, FIG. 7 illustrates an exemplary hardware system suitable for training an AI model that is capable of performing various functionalities in relation to an online game and/or game plays of the online game, in accordance with one embodiment of the present disclosure. This block diagram illustrates a device 700 that can incorporate or can be a personal computer, a server computer, gaming console, mobile device, or other digital device, each of which is suitable for practicing an embodiment of the invention. Alternately, the functionalities of the device could be implemented in a physical server or on a virtual machine or a container server. Device 700 includes a central processing unit (CPU) 702 for running software applications and optionally an operating system. CPU 702 may be comprised of one or more homogeneous or heterogeneous processing cores.

In accordance with various embodiments, CPU 702 is one or more general-purpose microprocessors having one or more processing cores. Further embodiments can be implemented using one or more CPUs with microprocessor architectures specifically adapted for highly parallel and computationally intensive applications, such as media and interactive entertainment applications, of applications configured for deep learning, content classification, and user classifications. For example, CPU 702 may be configured to include the deep learning (AI) engine 701 that is configured to support and/or perform learning operations with regards to providing various functionalities (e.g., predicting) in relation to an online game and/or game plays of the online game. The deep leaning engine 701 may include a modeler 720 that is configured for building and/or training the AI model that is configured to provide the various functionalities related to the online game and/or game plays of the online game. Further, the CPU 702 includes an analyzer 740 that is configured for generating and training an AI model. The trained AI model provides an output in response to a particular set of users' inputs, wherein the output is dependent on the predefined functionality of the trained AI model. The trained AI model may be used to determine the resource allocation that is to be implemented during the game play to meet the success criteria defined for the online game. The analyzer 740 is configured to perform various functionalities in relation to the online game and/or game plays of the online game, including analyzing the output from the trained AI model for a given input (e.g., controller input, game state data, success criteria), and provide a response.

Memory 704 stores applications and data for use by the CPU 702. Storage 706 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 708 communicate user inputs from one or more users to device 700, examples of which may include keyboards, mice, joysticks, touch pads, touch screens, still or video recorders/cameras, game controllers, and/or microphones. Network interface 714 allows device 700 to communicate with other computer systems via an electronic communications network, and may include wired or wireless communication over local area networks and wide area networks such as the internet. An audio processor 712 is adapted to generate analog or digital audio output from instructions and/or data provided by the CPU 702, memory 704, and/or storage 706. The components of device 700, including CPU 702, memory 704, data storage 706, user input devices 708, network interface 710, and audio processor 712 are connected via one or more data buses 722.

A graphics subsystem 713 is further connected with data bus 722 and the components of the device 700. The graphics subsystem 713 includes a graphics processing unit (GPU) 716 and graphics memory 718. Graphics memory 718 includes a display memory (e.g., a frame buffer) used for storing pixel data for each pixel of an output image. Graphics memory 718 can be integrated in the same device as GPU 716, connected as a separate device with GPU 716, and/or implemented within memory 704. Pixel data can be provided to graphics memory 718 directly from the CPU 702. Alternatively, CPU 702 provides the GPU 716 with data and/or instructions defining the desired output images, from which the GPU 716 generates the pixel data of one or more output images. The data and/or instructions defining the desired output images can be stored in memory 704 and/or graphics memory 718. In an embodiment, the GPU 716 includes 3D rendering capabilities for generating pixel data for output images from instructions and data defining the geometry, lighting, shading, texturing, motion, and/or camera parameters for a scene. The GPU 716 can further include one or more programmable execution units capable of executing shader programs. In one embodiment, GPU 716 may be implemented within AI engine to provide additional processing power, such as for the AI or deep learning functionality.

The graphics subsystem 713 periodically outputs pixel data for an image from graphics memory 718 to be displayed on display device 710, or to be projected by projection system 740. Display device 710 can be any device capable of displaying visual information in response to a signal from the device 700, including CRT, LCD, plasma, and OLED displays. Device 700 can provide the display device 710 with an analog or digital signal, for example.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

The invention claimed is:

1. A method, comprising:
executing an online game accessed for gameplay by a plurality of users, each user of the plurality of users is provided access to a virtual location of a gaming world provided by the online game;
identifying a virtual location of the gaming world where one or more users of the plurality of users are present;
evaluating a type and number of users of the type present in the virtual location generating gaming interactivity for the online game;
assigning one or more computes to the virtual location identified in the gaming world, the one or more computes identified to include compute resources required to handle processing load resulting from the gaming interactivity provided by said one or more users in the virtual location, wherein a number of computes assigned to the virtual location is based on the type and the number of users of the type generating the gaming interactivity in the virtual location;
monitoring the processing load on each compute resource of the one or more computes assigned to said virtual location of the gaming world; and
dynamically adjusting the number of computes assigned to said virtual location based on the processing load, so as to provide the compute resources to handle the processing load at said virtual location.

2. The method of claim 1, wherein dynamically adjusting the number of computes includes adjusting down the number of computes in response to detecting decrease in processing load at the virtual location,
wherein adjusting down includes re-assigning one or more of the computes assigned to the virtual location to a second virtual location within the gaming world in response to detecting increase in processing load at the second virtual location.

3. The method of claim 1, wherein dynamically adjusting the number of computes includes adjusting down the number of computes, wherein adjusting down includes de-assigning one or more of the computes assigned to the virtual location in response to detecting a decrease in processing load at the virtual location, the de-assigning includes,
identifying a first compute used to process gaming interactivity at the virtual location;
migrating game data resulting from processing of gaming interactivity assigned to the first compute to a second compute assigned to the virtual location; and
de-assigning the first compute after successful migration of the game data to the second compute, the second compute handling processing of gaming interactivity of the first and the second compute.

4. The method of claim 1, wherein when the number of users of the type exceeds a predefined limit specified for the one or more computes assigned to the virtual location, dynamically adjusting up the number of computes assigned for the virtual location for said type of users.

5. The method of claim 4, wherein dynamically adjusting further includes,
dividing the region into a plurality of sub-regions, in response to detecting said number of users of said type exceeding the predefined limit, wherein each sub-region of the plurality of sub-regions divided to include at least one user of said type in said sub-region; and assigning one or more additional computes for said region, such that the one or more computes and the one or more additional computes assigned for the region are configured to process gaming interactivity provided by said users of said type present in each sub-region of the plurality of sub-regions.

6. The method of claim 5, wherein assigning one or more additional computes for said region includes assigning at least one compute to process gaming interactivity provided by users of said type in each sub-region of the plurality of sub-regions, wherein the compute resource assigned to each sub-region is selected from any one of the one or more computes and the one or more additional computes assigned to said region.

7. The method of claim 5, wherein each sub-region of the plurality of sub-regions is defined by a boundary and is assigned one or more distinct compute for processing gaming interactivity originating from users of said type present in said sub-region; and wherein monitoring the processing load includes,
tracking movement of users of said type in said region;
detecting a user of said type moving from a first sub-region to a boundary defined between the first sub-region and a consecutive second sub-region of the plurality of sub-regions defined in the region; and
managing communication between computes assigned to each of the first and said second sub-regions, in response to detecting the user on the boundary, to enable processing of gaming interactivity of said user, the processing of gaming interactivity includes synchronizing game related data between the compute resources assigned to the first and the second sub-regions.

8. The method of claim 5, wherein monitoring the processing load includes tracking movement of the one or more users of said type into and out of a sub-region of the plurality of sub-regions, and when a number of users of said type falls below a predefined limit of minimum number of users defined for said compute in said sub-region, de-assigning the compute assigned to said sub-region, wherein de-assigning includes,
migrating game data resulting from processing of gaming interactivity assigned to said compute to a second compute assigned to a second sub-region, and
de-assigning the compute after successfully synchronizing game related data of the gaming world between the compute and the second compute, the second compute selected such that number of users of said type after migration is below the predefined limit defined for the second compute,
wherein the game related data is generated from the gaming interactivity of said one or more users in said region.

9. The method of claim 5, wherein tracking movement of each of said one or more users includes,
tracking movement of each of said one or more users within said region; and
adjusting a number of sub-regions within the region based on number of users of said type accessing the region, wherein the adjusting includes merging two or more sub-regions within the region or creating additional sub-regions within the region, wherein adjusting the number of sub-regions includes adjusting a number of computes assigned for processing gaming interactivity of the region.

10. The method of claim 5, wherein a number of said plurality of sub-regions created in the region is based on the number of said users of said type present in the region.

11. The method of claim 1, wherein dynamically adjusting the number of computes is done based on resource capabilities of the one or more computes assigned to the virtual location and resource requirements of the virtual location.

12. The method of claim 1, wherein each compute of the number of computes assigned to the virtual location manages gaming interactivity of select ones of users of said type to generate game video data that includes game state of the online game for each user of the select ones of users of said type, wherein a number of select ones of users of said type managed by each compute is defined to be below a predefined number of users of said type defined for said compute.

13. The method of claim 1, wherein the gaming interactivity in said region corresponds to user inputs provided by said one or more users during play of the online game, wherein said one or more users include one of players or spectators.

* * * * *